United States Patent
Goda et al.

(10) Patent No.: US 10,452,644 B2
(45) Date of Patent: Oct. 22, 2019

(54) COMPUTER SYSTEM, METHOD FOR VERIFYING DATA, AND COMPUTER

(71) Applicant: THE UNIVERSITY OF TOKYO, Tokyo (JP)

(72) Inventors: Kazuo Goda, Tokyo (JP); Masaru Kitsuregawa, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 329 days.

(21) Appl. No.: 15/303,345

(22) PCT Filed: Apr. 10, 2015

(86) PCT No.: PCT/JP2015/002032
§ 371 (c)(1),
(2) Date: Dec. 28, 2016

(87) PCT Pub. No.: WO2015/156000
PCT Pub. Date: Oct. 15, 2015

(65) Prior Publication Data
US 2017/0177653 A1 Jun. 22, 2017

(30) Foreign Application Priority Data
Apr. 11, 2014 (JP) ................ 2014-082174

(51) Int. Cl.
*G06F 9/46* (2006.01)
*G06F 16/23* (2019.01)
*G06F 9/48* (2006.01)
(52) U.S. Cl.
CPC ............ *G06F 16/2365* (2019.01); *G06F 9/48* (2013.01); *G06F 9/4881* (2013.01)

(58) Field of Classification Search
CPC ..................... G06F 17/30371; G06F 9/4881
See application file for complete search history.

(56) References Cited

U.S. PATENT DOCUMENTS 7,363,284 B1 *  4/2008  Plasek ............... G06F 17/30327
7,599,949 B1 * 10/2009  Plasek ............... G06F 17/30327
(Continued)

FOREIGN PATENT DOCUMENTS

| JP | 8-249222 A | 9/1996 |
| JP | 9-160790 A | 6/1997 |

(Continued)

OTHER PUBLICATIONS

H. Nokubi; UNIX Programming No. 6; Personal UNIX; Jul. 2000; pp. 148-153 and concise explanation.
(Continued)

*Primary Examiner* — Adam Lee
(74) *Attorney, Agent, or Firm* — Lucas & Mercanti, LLP

(57) ABSTRACT

The present invention relates to a technology for verifying relevance of data. One object of the present invention is to suppress increase in time required for verifying relevance of data. According to one embodiment of the present invention, a computer system includes: a storage apparatus configured to provide a storage area formed by storage devices; and a computer configured to manage data. The storage area is configured to store a plurality of pieces of data. The plurality of pieces of data include a first piece of data associated with a second piece of data. The computer is configured to: verify whether or not the first piece of data is normally associated with the second piece of data; and start, when the plurality of pieces of data are verified, verification for one piece of data irrespective of whether or not verification for another piece of data is complete.

13 Claims, 17 Drawing Sheets

(56) References Cited

U.S. PATENT DOCUMENTS

| | | | |
|---|---|---|---|
| 7,668,845 B1* | 2/2010 | Lomet | G06F 17/30327 707/711 |
| 2001/0042240 A1* | 11/2001 | Ng | G06F 8/427 717/122 |
| 2002/0133745 A1* | 9/2002 | Okin | G06F 11/1497 714/11 |
| 2005/0084022 A1* | 4/2005 | Okuyama | H04L 63/0428 375/259 |
| 2007/0022100 A1* | 1/2007 | Kitsuregawa | G06F 17/30433 |
| 2007/0206598 A1* | 9/2007 | Yamada | H04L 1/0052 370/392 |
| 2008/0005093 A1* | 1/2008 | Liu | G06F 17/30917 |
| 2008/0244244 A1* | 10/2008 | Tuuk | G06F 11/1064 712/226 |
| 2008/0282150 A1* | 11/2008 | Erwin | G06F 17/3089 715/255 |
| 2010/0146003 A1* | 6/2010 | Bruso | G06F 17/30327 707/797 |
| 2015/0082304 A1* | 3/2015 | Hepkin | G06F 21/53 718/1 |
| 2015/0350176 A1* | 12/2015 | Mabuchi | H04L 9/3271 726/6 |
| 2016/0154848 A1* | 6/2016 | Shimizu | G06F 17/30463 707/719 |

FOREIGN PATENT DOCUMENTS

| | | |
|---|---|---|
| JP | 2009015849 A | 1/2009 |
| JP | 2010066793 A | 3/2010 |
| JP | 2011039800 B1 | 2/2011 |

OTHER PUBLICATIONS

International Search Report dated Jul. 14, 2015 for PCT/JP2015/002032 and English translation.

* cited by examiner

Fig. 10

| ITEM | PERFORMANCE RESOURCES HELD BY SYSTEM (A) | RESOURCES USED THROUGH FILE ACCESS (B) | AVAILABLE RESOURCES ALLOCATABLE FOR CONSISTENCY VERIFICATION (A)-(B) | MAXIMUM AMOUNT OF RESOURCES ALLOCATABLE FOR CONSISTENCY VERIFICATION (C) |
|---|---|---|---|---|
| INPUT/OUTPUT BAND | 50,000 IO/s | 20,000 IO/s | 30,000 IO/s | 40,000 IO/s |
| TRANSFER BAND | 5,000 MB/s | 2,500 MB/s | 2,500 MB/s | 4,000 MB/s |
| NUMBER OF SIMULTANEOUS INPUT/OUTPUT REQUESTS | 1,000 IOs | 200 IOs | 800 IOs | 800 IOs |
| NUMBER OF SIMULTANEOUS EXECUTION THREADS | 800 Threads | 150 Threads | 650 Threads | 600 Threads |
| CPU USAGE | 100 % | 10 % | 90 % | 80 % |

COMPUTER SYSTEM, METHOD FOR VERIFYING DATA, AND COMPUTER

CROSS REFERENCE TO RELATED APPLICATION

This Application is a 371 of PCT/JP2015/002032 filed on Apr. 10, 2015, which, in turn, claimed the priority of Japanese Patent Application No. 2014-82174 filed on Apr. 11, 2014, both applications are incorporated herein by reference.

TECHNICAL FIELD

The present invention relates to a technology for verifying relevance of data.

BACKGROUND ART

In a computer system, a plurality of pieces of data are associated with one another as necessary and stored in a storage apparatus so that the plurality of pieces of data can be managed efficiently. For example, when a large volume of data is stored, the data is divided and then stored, to thereby enable data storage efficiency to be improved (refer to Patent Literature 1). At the same time, management information of the divided data is managed separately, and when a data read request is received, those divided pieces of data are combined for provision thereof.

CITATION LIST

Patent Literature

[PTL 1] JP 07-141232 A

SUMMARY OF INVENTION

Technical Problem

However, it is sometimes necessary to access the entire data storage area in order to verify relevance of stored data, and thus there is a concern that verification time may increase along with expansion of the data storage area.

It is an object of the present invention to suppress increase in time required for verifying relevance of data.

Solution to Problem

A representative example of the invention described in the present application is as follows. That is, according to one embodiment of the present invention, there is provided a computer system, including: a storage apparatus configured to provide a storage area formed by storage devices; and a computer configured to manage data, in which the storage area is configured to store a plurality of pieces of data, in which the plurality of pieces of data include a piece of data associated with another piece of data, and in which the computer is configured to: verify whether or not the piece of data is normally associated with the another piece of data; and start, when the plurality of pieces of data are verified, verification for one piece of data irrespective of whether or not verification for another piece of data is complete.

Advantageous Effects of Invention

According to the representative embodiment of the present invention, it is possible to suppress the increase in time required for verifying relevance of data.

BRIEF DESCRIPTION OF DRAWINGS

FIG. 10 is a table for showing an example of a resource availability table according to the first embodiment of the present invention.

DESCRIPTION OF EMBODIMENTS

First Embodiment

In a network file system (computer system) according to a first embodiment of the present invention, a client 300 executes business task processing in accordance with an application program 321, and reads or writes data necessary for the business task processing via a network file system server 100. Now, a description is given of a configuration of the network file system according to the first embodiment of the present invention.

Figure 1:
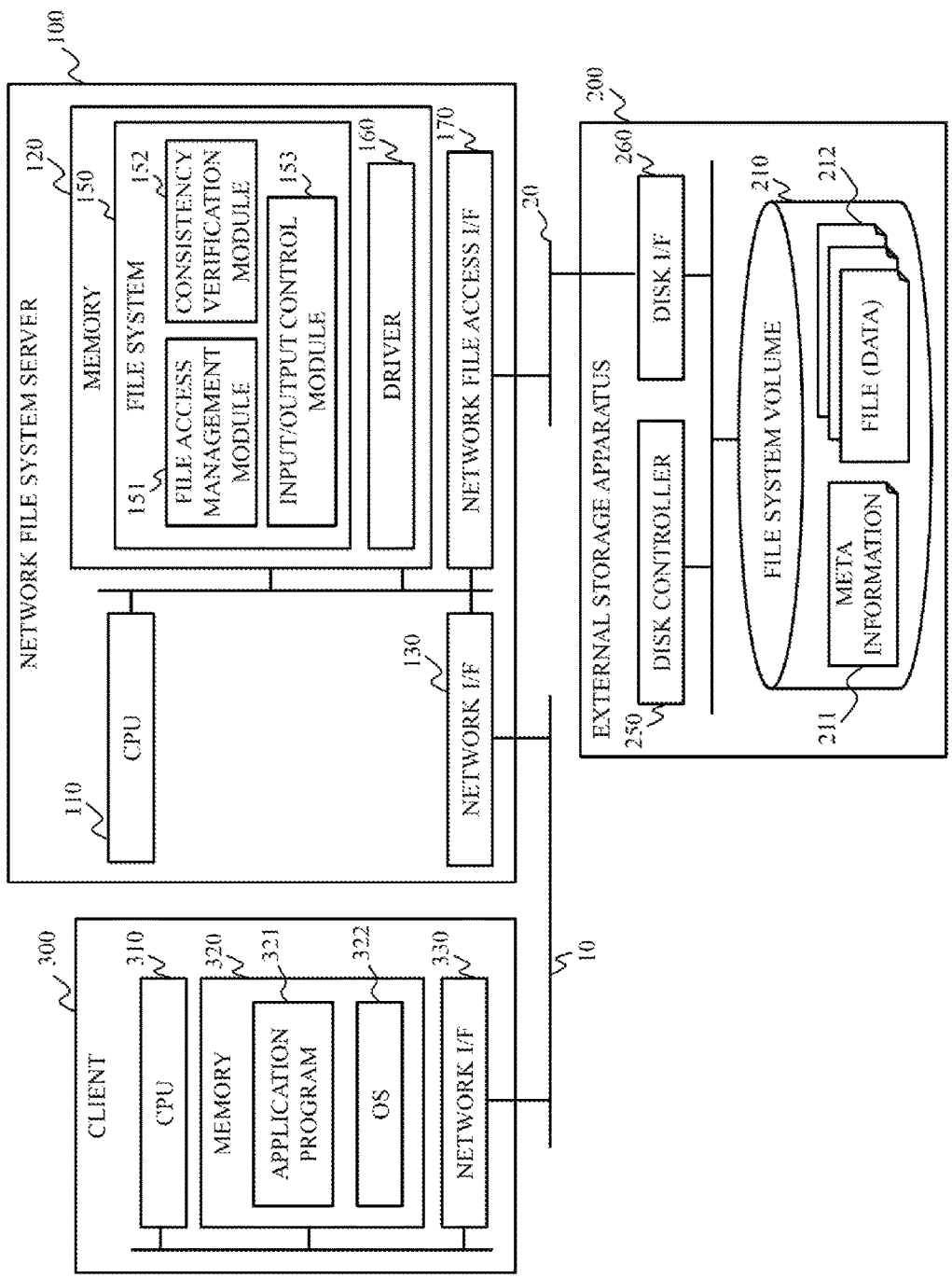
FIG. 1 is a diagram for illustrating a configuration of a network file system according to a first embodiment of the present invention.

FIG. 1 is a diagram for illustrating the configuration of the network file system according to the first embodiment of the present invention.

The network file system according to the first embodiment of the present invention includes the network file system server 100, an external storage apparatus 200, and the client 300. One or a plurality of the network file system servers 100 may be provided. Further, a plurality of the external storage apparatus 200 may be included in the system. Further, an arbitrary number of the clients 300 may be provided.

The network file system server 100 is configured to manage a file (data) stored in the external storage apparatus 200. The external storage apparatus 200 is configured to store a file (data) to be accessed by the client 300. The client 300 is configured to access a file (data) stored in the external storage apparatus 200 via the network file system server 100.

The network file system server 100 is connected to the client 300 via a network 10. The network 10 is, for example, an internet protocol (IP) network.

Further, the network file system server 100 is connected to the external storage apparatus 200 via a network 20. The network 20 and the network 10 may be a common network, or the network 20 may be a storage area network (SAN) employing, for example, a fiber channel (FC) protocol. The network file system server 100 and the external storage apparatus 200 are connected to each other via a SAN, to thereby be able to transmit/receive a large amount of data at high speeds while improving reliability of the transmission/reception.

Next, a description is given in detail of the network file system server 100, the external storage apparatus 200, and the client 300. First, the network file system server 100 is described.

The network file system server 100 retrieves a file (data) requested by the client 300 from the external storage apparatus 200, and transmits the file to the client 300.

The network file system server 100 includes a CPU 110, a memory 120, a network interface (I/F) 130, and a network file access interface (I/F) 170. The CPU 110, the memory 120, the network I/F 130, and the network file access I/F 170 are connected to one another via an internal bus.

The CPU 110 executes a program (not shown) stored in the memory 120, to thereby execute processing requested by the client 300 or processing instructed by an administrator via an input device (not shown).

The memory 120 stores a program to be executed by the CPU 110, data necessary for execution of the program, and other data. Further, the memory 120 temporarily stores data for transmission/reception between the external storage apparatus 200 and the client 300.

Further, the memory 120 stores a file system 150 for managing a storage area provided by the external storage apparatus 200. The file system 150 may be, for example, a function provided by an operating system (not shown), or a single program. In other cases, the file system 150 may be formed by a plurality of computers as in a distributed file system. Further, the memory 120 stores a driver 160, which is software for accessing a storage area provided by the external storage apparatus 200.

The file system 150 includes a file access management module 151, a consistency verification module 152, and an input/output control module 153. The file access management module 151 is configured to manage an access request for a file managed by the file system 150. For example, the file access management module 151 receives a file access request transmitted by the client 300, and inputs the received request into the input/output control module 153. Alternatively, the file access management module 151 may be configured to input a task containing an input/output request for a file, which is defined based on details of the request, rather than the file access request itself. In addition to the input/output processing on the external storage apparatus 200, the task contains processing that is based on a resultant response, e.g., processing of an output file (data), and other kinds of processing.

The consistency verification module 152 is configured to verify consistency (integrity) of files stored in a file system volume 210 described later. The consistency verification may be executed for each file or for each storage area (logical volume). When the consistency verification module 152 receives a consistency verification request (verification request) by, for example, command input, the consistency verification module 152 inputs the received consistency verification request into the input/output control module 153.

Figure 11:
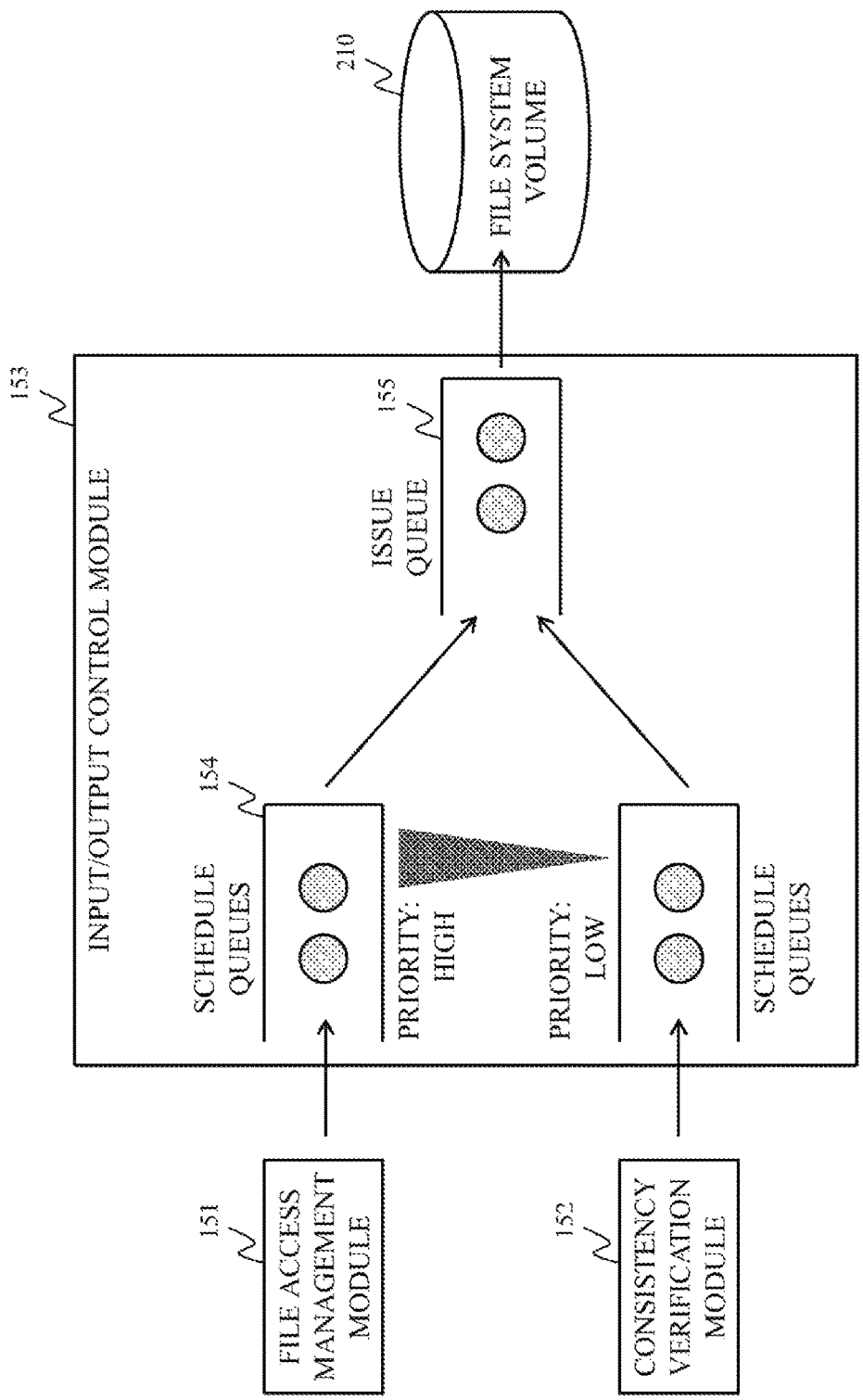
FIG. 11 is a diagram for illustrating structure of a queue for holding generation of a thread according to the first embodiment of the present invention.
Figure 12:
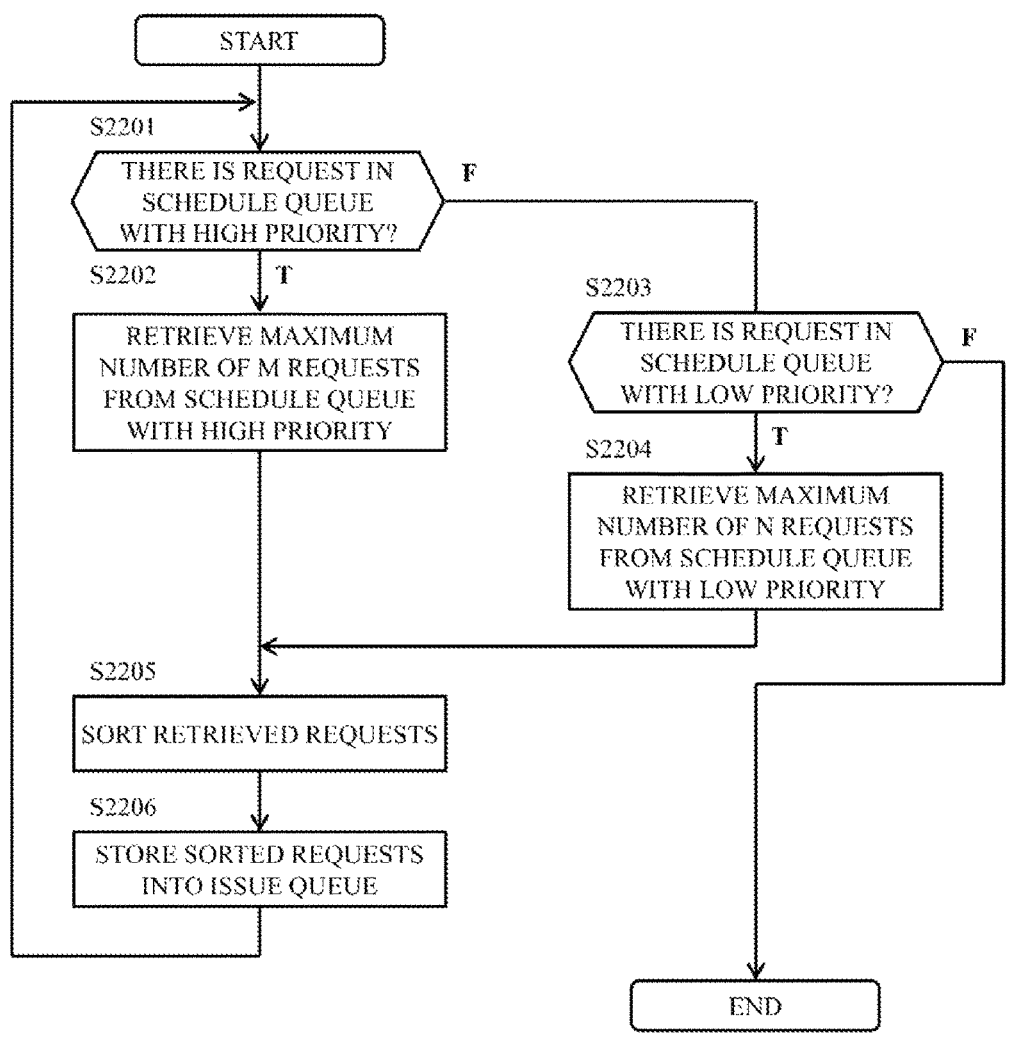
FIG. 12 is a flowchart for illustrating a procedure of moving a task stored in a schedule queue to an issue queue according to the first embodiment of the present invention.

The input/output control module 153 is configured to receive input of a request from the file access management module 151 or the consistency verification module 152, and to determine an order of accessing the file system volume 210 through execution of a task that is based on the request, namely, a processing order of the request. Then, the CPU 110 executes the task in the determined order, and issues an input/output request to the external storage apparatus 200. The specific procedure is described later (FIG. 11 and FIG. 12).

In the first embodiment of the present invention, the network 10 and the network 20 are configured separately, and the network file system server 100 includes interfaces for connecting to the respective networks. Alternatively, the network 10 and the network 20 may be the same, and a common interface for connecting to the network may be provided in that case.

The network I/F 130 is an interface for connecting to the network 10. Examples of the network I/F 130 include a network interface card. On the other hand, the network file access I/F 170 is an interface for connecting to the network 20. When the network 20 is the SAN described above, the network file access I/F 170 is, for example, a host bus adapter (HBA).

Next, the external storage apparatus 200 is described. The external storage apparatus 200 includes the file system volume 210, a disk controller 250, and a disk interface (I/F) 260.

The file system volume 210 is a storage area configured to store files to be accessed by the client 300. Further, the file system volume 210 is a logical volume formed by a plurality of storage devices. Configuration of the file system volume 210 with a plurality of storage devices allows provision of a storage area with a large volume.

The storage devices forming the file system volume 210 are each a non-volatile storage medium such as a hard disk drive (HDD), an optical disc drive, and a semiconductor storage device (solid state drive (SSD)). Further, a disk array may be formed by a plurality of storage devices.

The file system volume 210 stores meta information 211 containing, for example, a name and storage position of each file, and a file (data) 212, which is data to be read/written from outside.

The disk controller 250 is configured to execute control of, for example, read/write of a file. For example, the disk controller 250 reads/writes a file stored in the file system volume 210 based on an input/output request transmitted by the network file system server 100. Further, the disk controller 250 updates the meta information 211 along with, for example, update, deletion, or movement of a file.

The disk I/F 260 is an interface for connecting to the network file system server 100 via the network 20.

Next, the client 300 is described. The client 300 includes a CPU 310, a memory 320, and a network interface (I/F) 330.

The CPU 310 is configured to execute various kinds of processing through execution of programs stored in the memory 320. The memory 320 is configured to store programs to be executed by the CPU 310 and data necessary for execution of the programs. The programs to be executed by the CPU 310 include the application program 321 for executing business task processing and an operating system (OS) 322 for managing resources and for providing an interface to be used by the application program 321 for using various resources.

The network I/F 330 is an interface for connecting to the network 10, and may be the same as the network I/F 130 included in the network file system server 100. The network I/F 330 may connect to the network 10 in a wired or wireless manner.

The configuration of the network file system according to the first embodiment of the present invention has been described. Next, a description is given of structure for storing files (data) to be managed in the network file system according to the first embodiment of the present invention.

Figure 2:
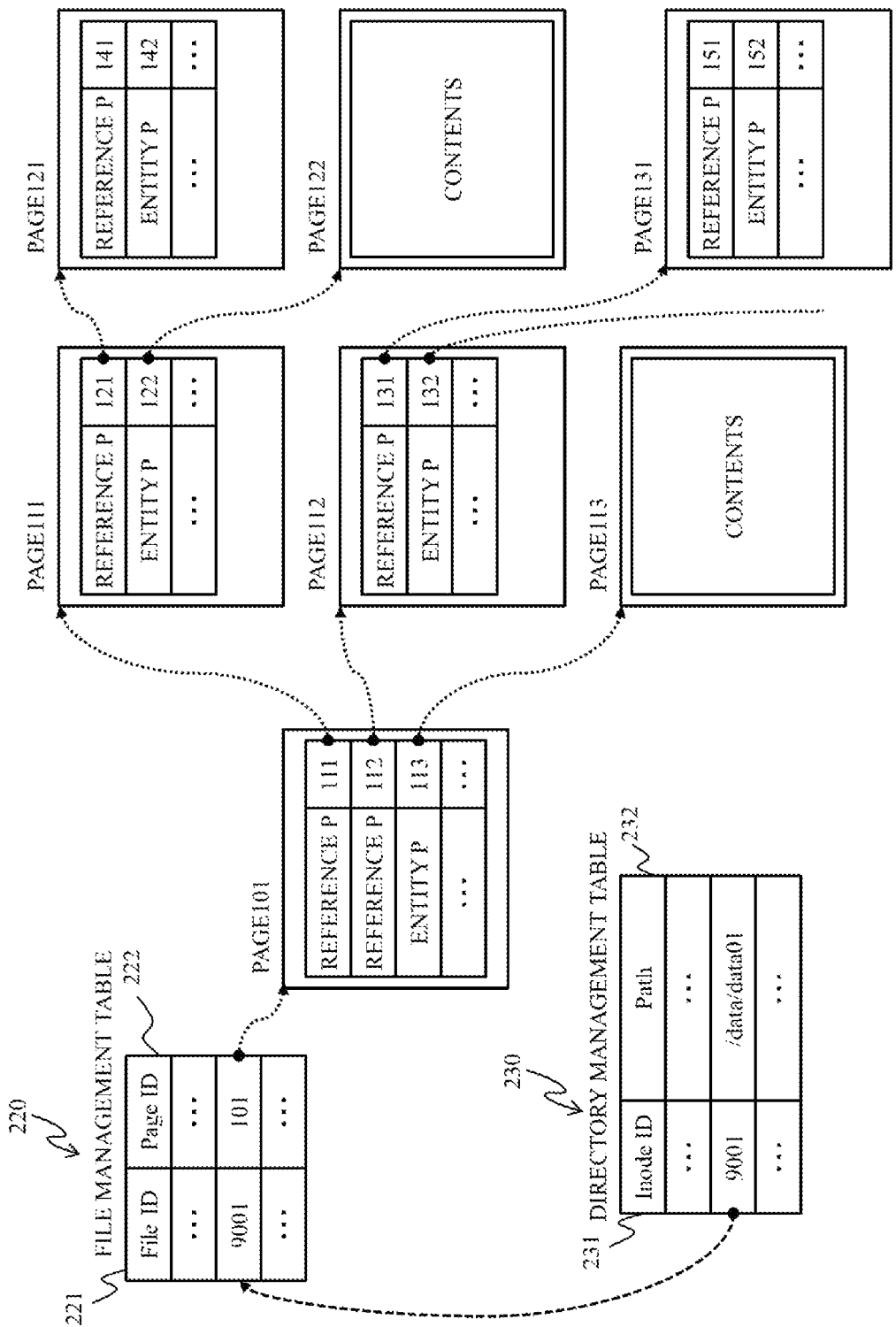
FIG. 2 is a diagram for illustrating structure for storing files according to the first embodiment of the present invention, and represents a state in which files are stored normally.
Figure 3:
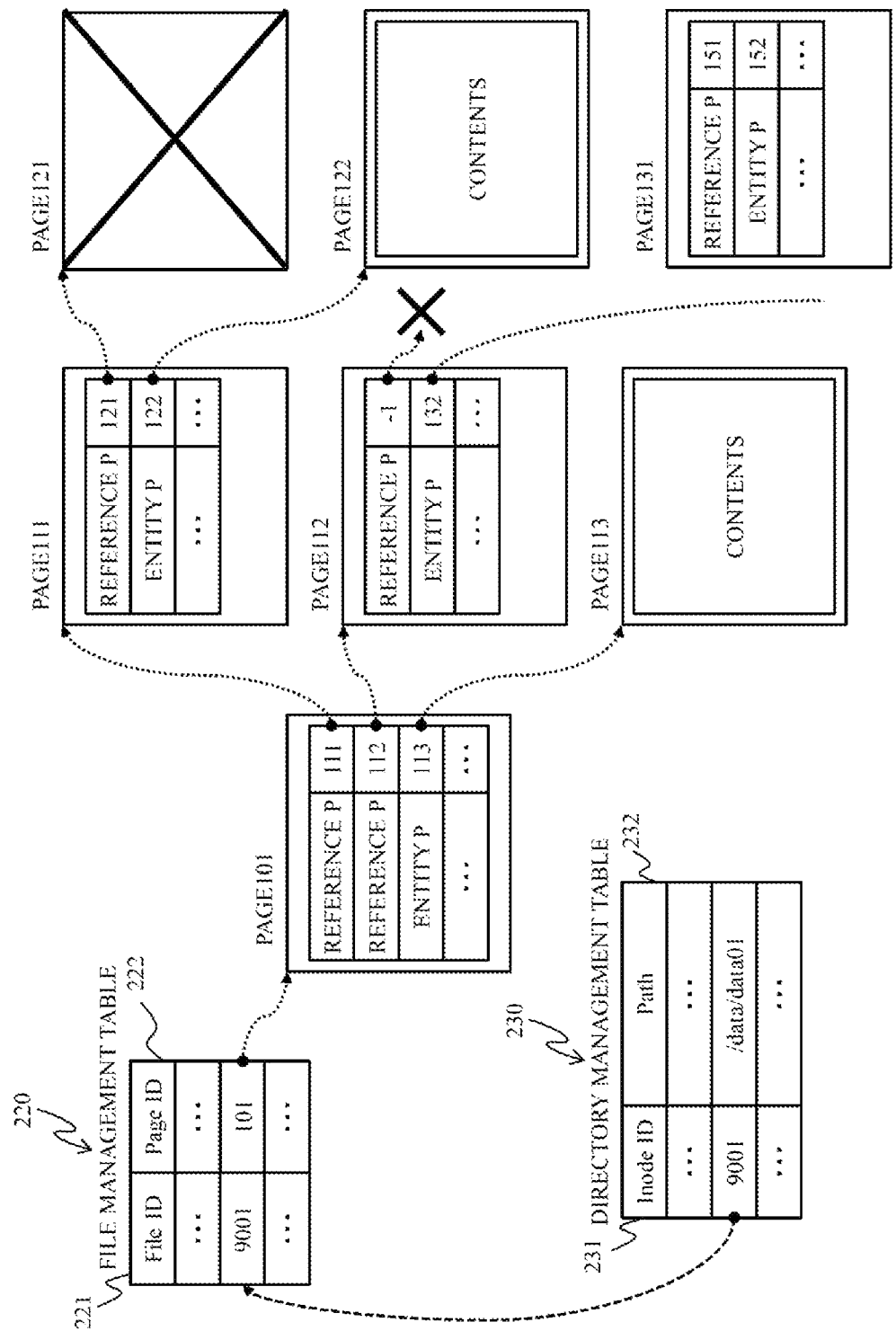
FIG. 3 is a diagram for illustrating the structure for storing files according to the first embodiment of the present invention, and represents a state in which storage information of files (data) is inconsistent.

FIG. 2 and FIG. 3 are each a diagram for illustrating structure for storing files according to the first embodiment of the present invention. FIG. 2 represents a state in which files are stored normally, whereas FIG. 3 represents a state in which storage information of files (data) is inconsistent.

First, a description is given of data structure for storing files in the file system according to the first embodiment of the present invention. Files stored in the file system according to the first embodiment of the present invention are managed based on a file management table (management information) 220.

The file management table 220 stores a file identifier (file ID) 221 for uniquely identifying a file and a page identifier (page ID) 222 for indicating a page (page area) storing the relevant file.

Further, when a file is stored in a directory, the file identifier 221 is stored in a directory management table 230 as an inode number (inode ID) 231 of the directory. Further, a path name (path) 232 of the directory storing the file is stored in association with the inode number 231.

The file management table 220 and the directory management table 230 may be contained in the meta information 211 stored in the file system volume 210 of the external storage apparatus 200, or may be held in the network file system server 100. Further, a computer for managing meta information of a plurality of external storage apparatus 200 may be included in the network file system.

In the first embodiment of the present invention, a file (data) is divided in units of pages and stored. Each page contains a reference pointer (P) for indicating a position of a divided page and an entity pointer (P) for indicating a position of a page storing details (contents) of a file. The reference P and the entity P correspond to page identifiers of referenced pages, and pointers (addresses) and page identifiers are set to be the same as each other in FIG. 2 and FIG. 3 to facilitate understanding.

Further, the reference P and the entity P are contained in the page referred to by the reference P. Further, details (contents) of a divided file are stored in the page referred to by the entity P.

Both of the reference pointer and the contents, instead of only one of the reference pointer and the contents, may be stored in a page as illustrated in FIG. 2. Through this configuration, the structure of a page is unified, and thus processing of accessing a file can be simplified.

Now, the data structure is described specifically with reference to FIG. 2. First, the file management table 220 stores a record set to have "9001" as the file identifier 221 and "101" as the page identifier 222. Further, a file having "9001" as the file identifier 221 (hereinafter referred to as "file 9001") is stored in a directory "/data/data01". Thus, the directory management table 230 stores a record set to have "9001", which is the file identifier 221, as the inode number 231, and "/data/data01" is set as the path name in that record.

In a page having "101" as the page identifier 222 (hereinafter referred to as "page 101"), reference Ps "111" and "112", and an entity P "113" are set. Similarly, a reference P "121" and an entity P "122", a reference P "131" and an entity P "132", a reference P "141" and an entity P "142", and a reference P "151" and an entity P "152" are set in a page 111, a page 112, a page 121, and a page 131, respectively. Thus, an entity of the file 9001 is divided and stored in a page 113, a page 122, a page 132, a page 142, a page 152, and so on.

In the above, the state in which the file 9001 is stored normally has been described with reference to FIG. 2. Next, a description is given of a state in which information (reference P) for indicating a storage position of the file 9001 is inconsistent with reference to FIG. 3.

As illustrated in FIG. 3, the file management table 220 and the directory management table 230 are similar to those of the example illustrated in FIG. 2. Further, the page 101 is also similar to that of the normal case, but there is a lack of a page in the page 121 referred to by the reference P of the page 111, and thus details thereof cannot be referred to. Further, the reference P of the page 112 has an invalid pointer (−1), and thus the referenced page cannot be identified.

When a file is stored normally, reference Ps can be traced from the page identifier 222, which corresponds to a head page stored in the file management table 220, and the file can be acquired by combining contents stored in referenced pages of entity Ps. However, as illustrated in FIG. 3, when there is a lack of a page referred to by the reference P or when the value of the reference P is invalid, the file cannot be read normally. The consistency verification in the first embodiment of the present invention is verification for determining whether or not pages storing contents forming a file are registered normally.

In the first embodiment of the present invention, each file forms a tree structure in which each page is a node and a connection (reference) between pages by the reference P or the entity P is an edge. Further, one file is configured to correspond to one tree, and a tree corresponding to each file has as its root a node corresponding to a page corresponding to the page identifier 222 that is stored in the file management table 220 in association with the file. Further, in the examples illustrated in FIG. 2 and FIG. 3, any one of the reference pointer and the contents is stored in a page, and thus contents are stored in a node serving as a leaf.

In the following, a description is given of a procedure of verifying whether or not storage information of files is normal. The consistency (integrity) verification of a file system is usually provided as a function of an operating system. For example, UNIX (trademark)-related OSs and Windows (trademark) provide an fsck command and a Scandisk command, respectively, as a function of verifying consistency of a file. Those commands each include a function of attempting to recover inconsistency of a file (when consistency of the file is impaired).

Figure 4:
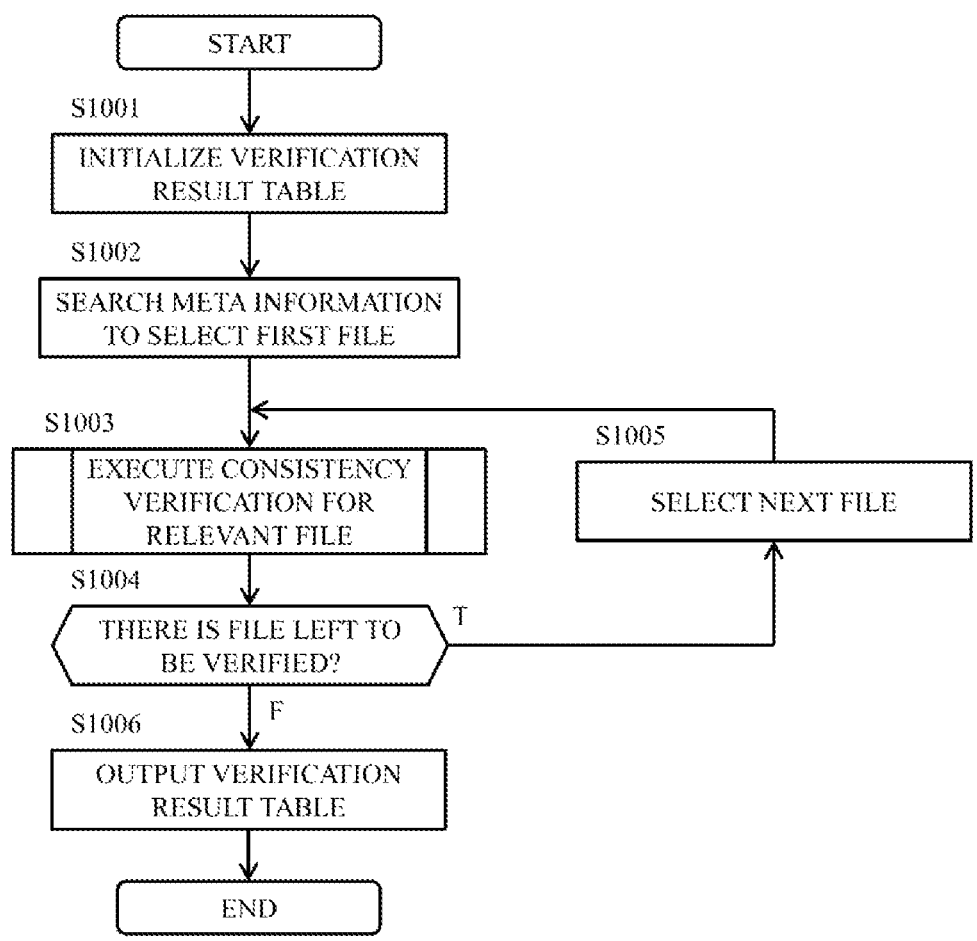
FIG. 4 is a flowchart for illustrating a procedure of executing consistency verification on files stored in a file system volume according to the first embodiment of the present invention.

FIG. 4 is a flowchart for illustrating a procedure of executing consistency verification for files stored in the file system volume 210 according to the first embodiment of the present invention. This processing is executed by the network file system server 100 in response to activation of the system or input of a command requesting execution of consistency verification, to verify consistency of each file stored in the external storage apparatus 200. Further, although consistency verification is executed for all the files contained in the file management table 220 in the flowchart illustrated in FIG. 4, consistency verification may be executed for specified files or directories.

Figure 7:
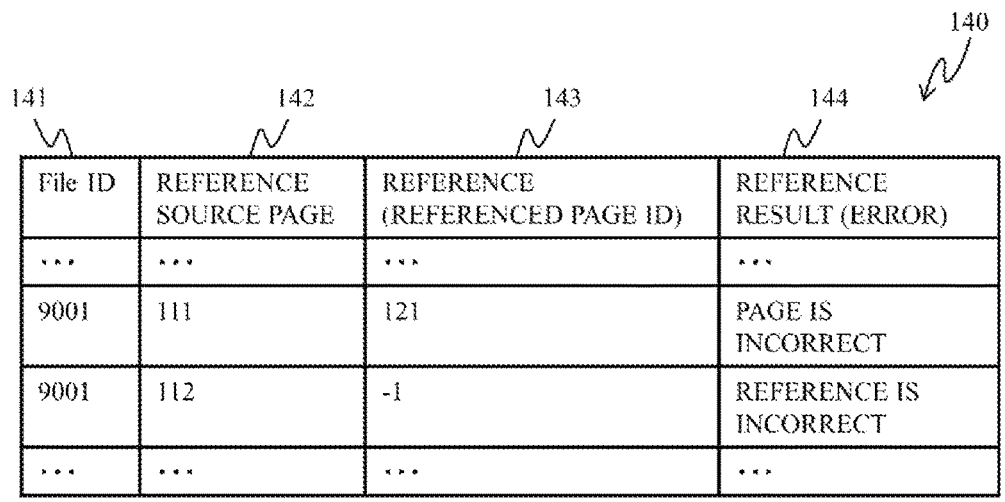
FIG. 7 is a table for showing an example of the verification result table according to the first embodiment of the present invention.

The CPU 110 of the network file system server 100 initializes a verification result table 140 for recording the result of consistency verification when the file system volume 210 starts the consistency verification (Step S1001). The verification result table 140 may be stored in the file system 150 or may be stored as a part of the meta information 211 in the external storage apparatus 200. When the file system 150 stores the verification result table 140, the verification result table 140 may be stored in a non-volatile storage device (not shown) included in the network file system server 100. The details of the verification result table 140 are described later (FIG. 7).

Figure 5:
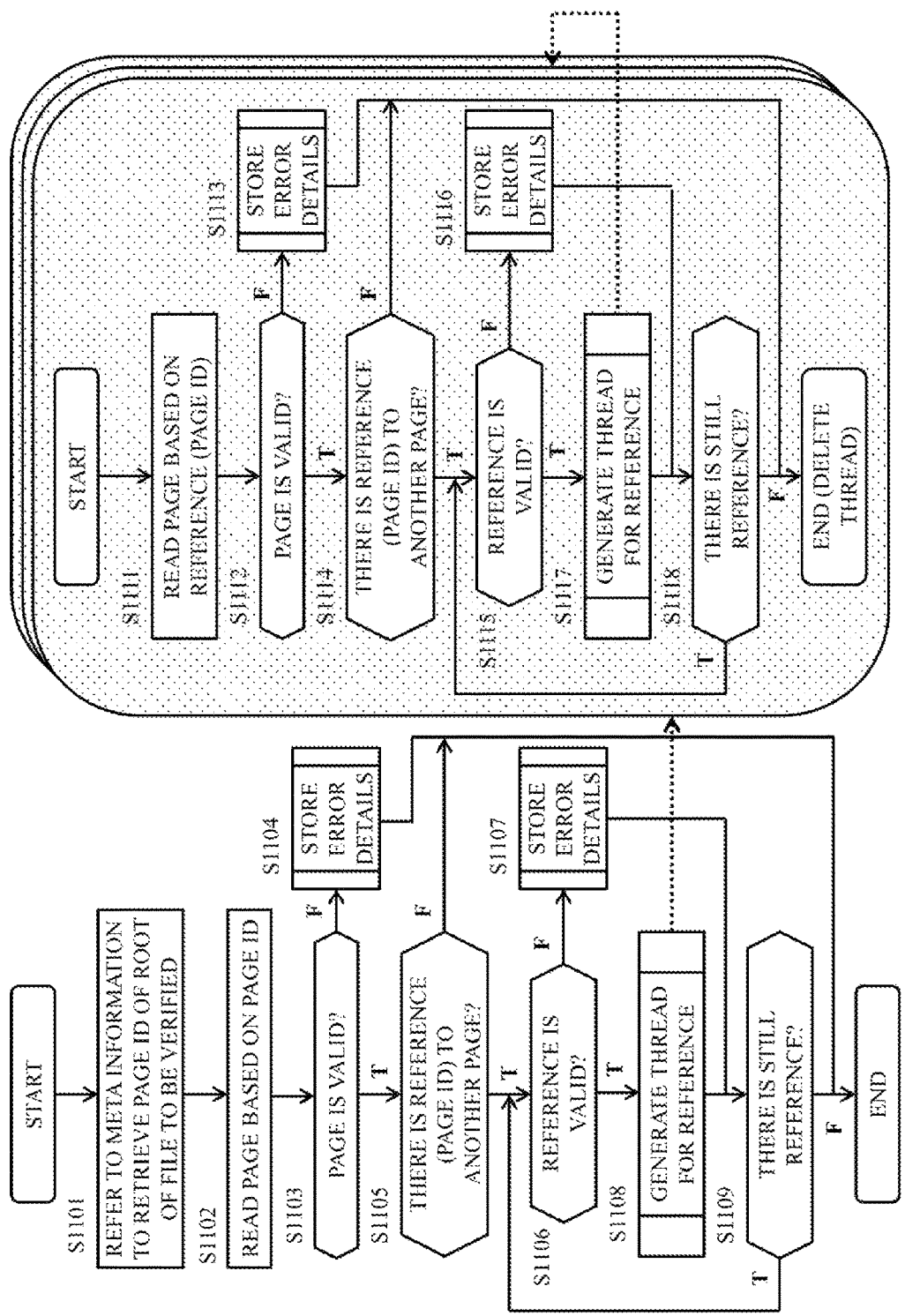
FIG. 5 is a flowchart for illustrating a procedure of verifying consistency of a file according to the first embodiment of the present invention.

Next, the CPU 110 searches the file management table 220 of the meta information 211 stored in the external storage apparatus 200, and selects a file to be verified (Step S1002). Then, the CPU 110 executes, for the selected file, consistency verification for verifying whether or not the storage information of the selected file is consistent (Step S1003). A detailed procedure of the consistency verification is described later (FIG. 5).

When the CPU 110 finishes the consistency verification for the file to be verified, the CPU 110 determines whether or not there is a file left to be verified (Step S1004). When there is a file left to be verified ("T" in the result of Step S1004), the CPU 110 selects a next file to be verified (Step S1005), and executes consistency verification for the next file (Step S1003).

In this manner, when consistency verification has been complete for all the files to be verified ("F" in the result of Step S1004), the CPU 110 outputs the verification result table 140 (Step S1006), to end this processing.

Incidentally, as described above, the external storage apparatus 200 according to the first embodiment of the present invention can provide an area with a large volume, which cannot be provided by a single storage device alone, by causing a plurality of storage devices to form a storage area. Further, a redundant configuration may be formed by a plurality of storage devices in order to improve reliability (fault tolerance) of the storage apparatus. In the storage area thus configured, respective pages storing contents of one file may be separately stored in a plurality of storage devices. Therefore, when verifying pages stored in different storage devices, it is possible to speed up consistency verification by verifying respective pages in parallel. Now, the procedure of consistency verification for a file is described specifically.

FIG. 5 is a flowchart for illustrating a procedure of verifying consistency of a file according to the first embodiment of the present invention. This processing, which is executed by the network file system server 100, is processing of verifying consistency of each file stored in the external storage apparatus 200.

The CPU 110 of the network file system server 100 first refers to the file management table 220 of the meta information 211, and retrieves the page identifier 222 of a page serving as the root of a file to be verified (Step S1101). Further, the CPU 110 reads the corresponding page based on the retrieved page identifier 222 (Step S1102).

Figure 6:
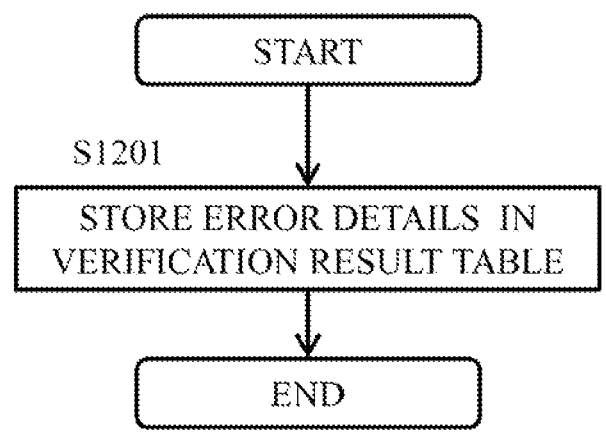
FIG. 6 is a flowchart for illustrating a procedure of processing of storing error details in a verification result table according to the first embodiment of the present invention.

Next, the CPU 110 determines whether or not the read page is valid (Step S1103). For example, when details stored in a page indicated by the reference pointer or the entity pointer cannot be read due to a faulty sector or other causes, the CPU 110 determines that the page is not valid. When the read page is not valid ("N" in the result of Step S1103), the CPU 110 executes processing of storing error details (Step S1104). The processing of storing error details is described later (FIG. 6).

In contrast, when the read page is valid ("T" in the result of Step S1103), the CPU 110 determines whether or not the page identifier of another referenced page is contained in the read page (Step S1105). As described above, the page identifier of another page is a reference pointer or an entity pointer. When the page identifier of another page is not contained ("F" in the result of Step S1105), the CPU 110 ends this processing.

When the page identifier of another page is set in the read page ("T" in the result of Step S1105), the CPU 110 determines whether or not the page identifier of another page is valid (Step S1106). When the page identifier of another page is not valid ("F" in the result of Step S1106), such as when there is no page corresponding to the page identifier, the CPU 110 executes processing of storing error details (Step S1107), and executes processing of Step S1109 and subsequent steps.

When the page identifier of another page is valid ("T" in the result of Step S1106), the CPU 110 generates a thread for executing consistency verification for the another page (Step S1108). Then, the generated thread executes consistency verification with the another page being set as a root (Step S1111 to Step S1116). Details thereof are described later.

When the CPU 110 generates a thread for executing consistency verification for another page, the CPU 110 does not wait until the consistency verification being executed by the thread is complete, and determines whether or not another page identifier is contained in the read page (Step S1109).

When another page identifier is contained in the read page ("T" in the result of Step S1109), the CPU 110 executes processing of Step S1106 and subsequent steps for the another page identifier. In contrast, when another page identifier is not contained in the read page ("F" in the result of Step S1109), the CPU 110 ends this processing.

Now, a description is given of consistency verification to be executed by a thread generated in the processing of Step S1108. In the first embodiment of the present invention, a plurality of threads can be generated in parallel, and consistency verification for each page is recursively executed, to thereby enable processing of consistency verification for a plurality of pages in parallel.

When a thread is activated based on the page identifier of another page in the processing of Step S1108, the CPU 110 reads the corresponding page based on the page identifier of the another page (Step S1111). Then, the CPU 110 determines whether or not the read page is valid (Step S1112). The processing of Step S1112 is similar to that of Step S1103.

When the read page is not valid ("N" in the result of Step S1112), the CPU 110 executes processing of storing error details (Step S1113). In contrast, when the read page is valid ("T" in the result of Step S1112), the CPU 110 determines whether or not the read page contains a page identifier further referring to another page (Step S1114).

When a page identifier referring to another page is not contained in the read page ("F" in the result of Step S1114), the CPU 110 ends this processing. At this time, the thread that has been generated to execute this processing is deleted to suppress memory consumption.

Further, when a page identifier referring to another page is contained in the read page ("T" in the result of Step S1114), the CPU 110 determines whether or not the page identifier referring to another page is valid (Step S1115). When the page identifier referring to another page is not valid ("F" in the result of Step S1115), the CPU 110 executes processing of storing error details (Step S1116), and executes processing of Step S1118 and subsequent steps.

When the page identifier of another page is valid ("T" in the result of Step S1115), the CPU 110 additionally generates a thread for executing consistency verification for the another page (Step S1117), and executes a series of processing of from Step S1111 to Step S1118 to execute consistency verification. The series of processing of from Step S1111 to Step S1118 is a "task" for executing consistency verification. In the first embodiment of the present invention, one task is executed on one thread until its completion (this also includes a case in which a new thread is generated to execute another task). In addition to consistency verification, the task also includes, for example, processing of accessing a file normally.

Further, the CPU 110 determines whether or not another page identifier is contained in the read page (Step S1118). Then, when another page identifier is contained ("T" in the result of Step S1118), the CPU 110 generates a new thread for the another page identifier to execute a task for carrying out consistency verification. In contrast, when another page identifier is not contained ("F" in the result of Step S1118), the CPU 110 ends this processing.

As described above, in the first embodiment of the present invention, when a thread for executing consistency verification is generated, consistency verification is recursively executed for each page without waiting for completion of the consistency verification being executed by the thread. In this manner, it is possible to reduce a period of time required for verification by executing a plurality of consistency verification processes in parallel.

In the first embodiment of the present invention, the network file system server 100 determines whether or not pages storing data are set normally, that is, whether or not pages referred to by page identifiers are normal (exist), and whether or not those page identifiers are normal themselves. In other cases, the disk controller 250 of the external storage apparatus 200 may determine whether or not pages storing data are set normally. Further, when the file management table 220 is contained in the meta information 211 of the file system volume 210, the external storage apparatus 200 may execute consistency verification to generate the verification result table.

Further, the disk controller 250 of the external storage apparatus 200 may manage information necessary for consistency verification, e.g., the file management table 220, and execute processing illustrated in the flowchart of FIG. 5. Through this configuration, the external storage apparatus 200 can conduct management of consistency of data (file) including consistency verification, and reduce loads on the network file system server 100.

Further, in the first embodiment of the present invention, threads are not generated without limitation, but the number of threads to be generated is limited depending on resources and the like of the network file system server 100, and generation of a thread is held when the limit is reached. Control of limitation on the number of threads to be generated and the execution order of generated threads and other control are described later (FIG. 8 to FIG. 12).

Next, generation and contents of the verification result table 140 are described. FIG. 6 is a flowchart for illustrating a procedure of processing of storing error details in the verification result table 140 according to the first embodiment of the present invention. FIG. 7 is a table for showing an example of the verification result table 140 according to the first embodiment of the present invention.

The CPU 110 of the network file system server 100 writes details of a generated error into the verification result table 140 (Step S1201). Specifically, as illustrated in FIG. 7, the verification result table 140 stores an identifier (file ID) 141 of a file in which an error has occurred, a reference source page 142, a referenced page (referenced page ID) 143, and a reference result (type of error) 144.

Further, as illustrated in FIG. 7, the reference result contains, for example, invalidity of a page or invalidity of a referenced page identifier. The invalidity of a page includes a case in which an area storing the page is physically corrupt. The invalidity of a referenced page identifier includes a case in which a page corresponding to the page identifier does not exist.

As described above, consistency verification is executed for each page and the verification result table 140 is created, to thereby enable identification of a page in which an error has occurred. Then, it is possible to execute processing of, for example, recovering a file with reference to the verification result table 140.

Now, the limitation on the number of generated threads is described. In the first embodiment of the present invention, it is determined whether or not to allow generation of a thread based on a resource availability table 180 (FIG. 10) recording availability (performance) of resources of, for example, the network file system server 100 and the network 20. When generation of a thread is not allowed, generation of a thread is held until the generation becomes possible. In the following, details thereof are described.

Figure 8:
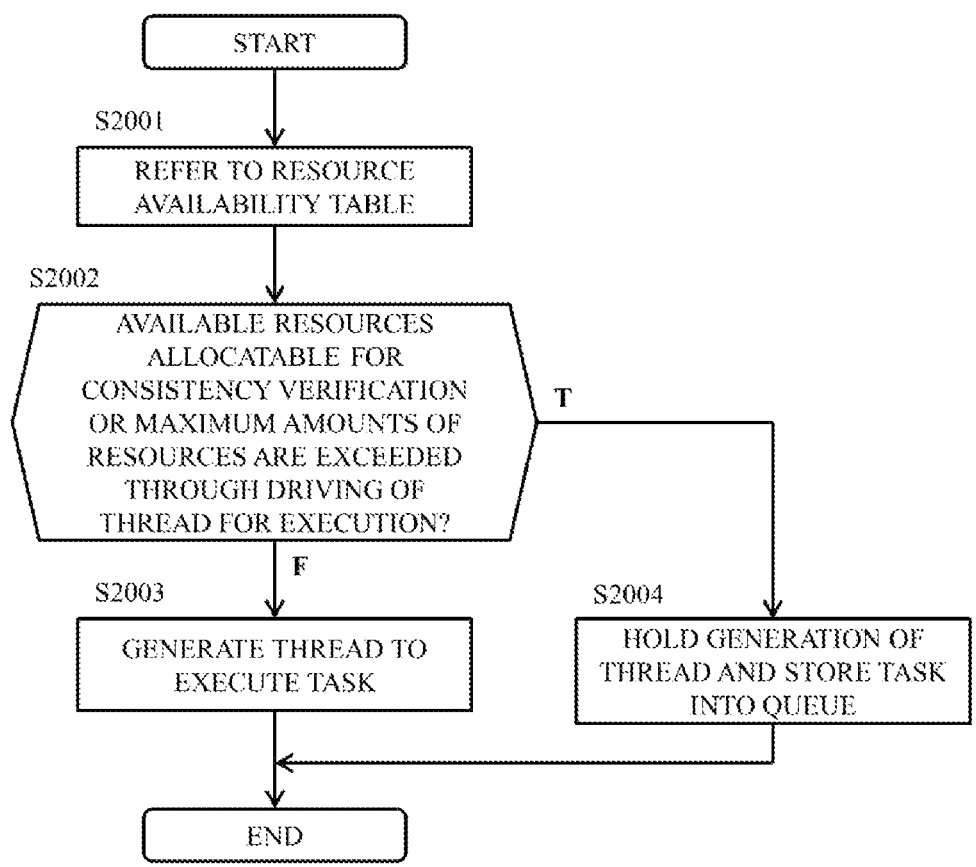
FIG. 8 is a flowchart for illustrating a procedure of generating a thread for executing consistency verification according to the first embodiment of the present invention.

FIG. 8 is a flowchart for illustrating a procedure of generating a thread for executing consistency verification according to the first embodiment of the present invention.

The CPU 110 of the network file system server 100 first refers to the resource availability table 180 (Step S2001) to determine whether or not a predetermined constraint condition for executing consistency verification is satisfied. Specifically, it is determined whether or not available resources allocatable for executing consistency verification are secured, or whether or not the total amounts of resources to be used at the time of consistency verification exceed predetermined maximum amounts of resources (threshold values) (Step S2002).

The predetermined constraint condition includes, for example, constraints on resources of the network file system server 100, such as the number of threads to be simultaneously executed (generated) and a usage of the CPU 110, and constraints on network resources, such as a transfer band between the network file system server 100 and the storage apparatus 200. Specific examples of resources and constraint conditions of the resources are described later (FIG. 10).

When the available resources allocatable for executing consistency verification and the maximum amounts of resources are not exceeded ("F" in the result of Step S2002), the CPU 110 generates a thread (Step S2003) to execute a task for carrying out consistency verification. In contrast, when the available resources allocatable for executing consistency verification or the maximum resources are exceeded ("T" in the result of Step S2002), generation of a thread is held and a task to be executed by the thread is stored in a queue for causing the thread to wait until the thread can be generated (Step S2004). A series of procedures (tasks) for executing consistency verification may be defined in advance to store the identifier of a page to be subjected to consistency verification into the queue.

Figure 9:
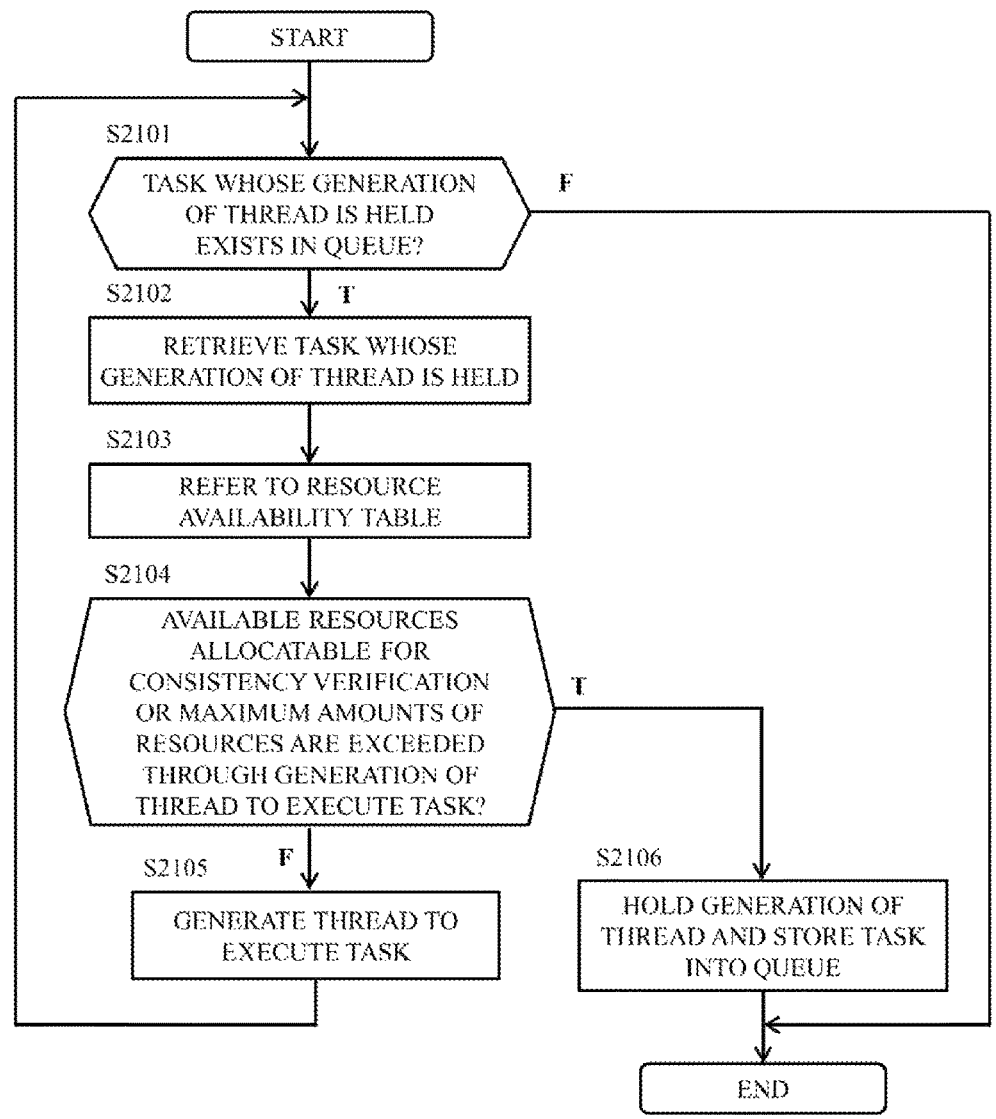
FIG. 9 is a flowchart for illustrating a procedure of resuming a thread for executing consistency verification according to the first embodiment of the present invention.

Next, a procedure for resuming (generating) a thread stored in the queue is described. FIG. 9 is a flowchart for illustrating a procedure of resuming a thread for executing consistency verification according to the first embodiment of the present invention.

The CPU 110 of the network file system server 100 first determines whether or not a task whose generation of a thread is held exists in the queue (Step S2101). When there is no such task ("F" in the result of Step S2101), the CPU 110 ends this processing.

In contrast, when a task whose generation of a thread is held exists in the queue ("T" in the result of Step S2101), the CPU 110 retrieves a task stored at the head of the queue (Step S2102). Then, as illustrated in FIG. 8, the CPU 110 refers to the resource availability table 180 (Step S2103) and generates a thread to execute the task (consistency verification), to thereby determine whether or not the allocatable available resources for executing consistency verification or the maximum resources are exceeded (Step S2104).

When the available resources allocatable for executing consistency verification and the maximum amounts of resources are not exceeded ("F" in the result of Step S2104), the CPU 110 generates a thread (Step S2105) to execute a task (consistency verification). In contrast, when the available resources allocatable for executing the task (consistency verification) or the maximum resources are exceeded ("T" in the result of Step S2104), generation of a thread is held and the task is again stored in a queue for causing the thread to wait until the thread can be generated (Step S2106).

The procedure of generating a thread has been described above. Next, a description is given of the resource availability table 180 for determining whether or not to allow generation of a thread. FIG. 10 is a table for showing an example of the resource availability table 180 according to the first embodiment of the present invention.

In the first embodiment of the present invention, whether or not to generate a thread is determined based on five items, namely, an input/output band, a transfer band, the number of simultaneous input/output requests, the number of simultaneous execution threads, and a CPU usage. Alternatively, whether or not to generate a thread may be determined based on other items.

Further, regarding those items, "performance resources held by system (A)", which is the maximum amount of resources that can be used by the system, and "resources used through file access (B)", which is resources used to access a file stored in the external storage apparatus 200, are set in advance. Further, it is possible to calculate "available resources allocatable for consistency verification (A)-(B)" by subtracting "resources used through file access (B)" from "performance resources held by system (A)". Further, the "maximum amount of resources allocatable for consistency verification (C)", which takes resources necessary for file access into consideration, is set.

In the first embodiment of the present invention, as described above, generation of a thread is allowed when consumption of resources before (or after) generation of a thread does not exceed the "available resources allocatable for consistency verification (A)-(B)" and the "maximum amount of resources allocatable for consistency verification (C)". In the following, each item is described.

The input/output band is the number of input/output requests that can be transmitted by the network file system server 100 to the external storage apparatus 200 in one second. The performance resource held by the system (A) is 50,000 IO/s and the resource used through file access (B) is 20,000 IO/s. Therefore, the available resource allocatable for consistency verification is 30,000 IO/s. Further, the maximum amount of resources allocatable for consistency verification (C) is 40,000 IO/s.

The transfer band is an amount of data that can be transmitted between the network file system server 100 and the external storage apparatus 200 in one second. The performance resource held by the system (A) is 5,000 MB/s and the resource used through file access (B) is 2,500 MB/s. Therefore, the available resource allocatable for consistency verification is 2,500 MB/s. Further, the maximum amount of resources allocatable for consistency verification (C) is 4,000 MB/s.

The number of simultaneous input/output requests is the number of input/output requests to be simultaneously issued to the external storage apparatus 200. The performance resource held by the system (A) is 1,000 IOs, which means that the maximum number of 1,000 input/output requests can be issued simultaneously. Further, the resource used through file access (B) is 200 IOs. Therefore, the available resource allocatable for consistency verification is 800 IOs. Further, the maximum amount of resources allocatable for consistency verification (C) is 800 IOs.

The number of simultaneous execution threads is the number of threads that can be executed (generated) by the network file system server 100. The performance resource held by the system (A) is 800 threads, and the resource used through file access (B) is 150 threads. Therefore, the available resource allocatable for consistency verification is 650 threads. Further, the maximum amount of resources allocatable for consistency verification (C) is 600 threads.

The CPU usage is a usage of the CPU 110 in the network file system server 100. The performance resource held by the system (A) is 100%, and the resource used through file access (B) is 10%. Therefore, the available resource allocatable for consistency verification is 90%. Further, the maximum amount of resources allocatable for consistency verification (C) is 80%.

The resource amounts being used by the system may be acquired through use of commands provided by an operating system in advance, or equivalent functions may be implemented.

Next, a description is given of a configuration for holding generation of a thread. FIG. 11 is a diagram for illustrating structure of a queue for holding generation of a thread according to the first embodiment of the present invention.

When the client 300 transmits an access request for a file stored in the external storage apparatus 200, the network file system server 100 receives the access request with the file access management module 151. After the file access management module 151 receives an access request, the file access management module 151 sends the received access request to the input/output control module 153.

Further, the network file system server 100 receives with the consistency verification module 152 a consistency verification request for a storage area provided by the external storage apparatus 200. After the consistency verification module 152 receives a consistency verification request, the consistency verification module 152 sends the received consistency verification request to the input/output control module 153.

The input/output control module 153 includes a plurality of schedule queues 154 each with a set priority and an issue queue 155 for holding generation of a thread. Through processing of a request stored in the issue queue 155, an input/output request is issued to the file system volume 210.

The input/output control module 153 stores an access request received from the file access management module 151 into the schedule queue 154 with a high priority. On the other hand, the input/output control module 153 stores a consistency verification request received from the consistency verification module 152 into the schedule queue 154 with a low priority. Priorities of the access request for a file and the consistency verification request for a storage area may be set separately.

When an access request for a file or a consistency verification request for a storage area is stored in the schedule queue 154, the input/output control module 153 selects a request from the schedule queue 154 based on the type of the request and the like, and moves the selected request to the issue queue 155. A description is later given of a procedure for moving a request from the schedule queue 154 to the issue queue 155 (FIG. 12). Then, the input/output control module 153 issues an input/output request to the file system volume 210 through processing of a request retrieved from the head of the issue queue 155.

FIG. 12 is a flowchart for illustrating a procedure of moving a request stored in the schedule queue 154 to the issue queue 155 according to the first embodiment of the present invention. The timing of moving a request stored in the schedule queue 154 to the issue queue 155 may be, for example, when the number of requests stored in the issue queue 155 is equal to or less than a predetermined number, or when the number of generated threads is equal to or less than a predetermined number.

The CPU 110 of the network file system server 100 first determines whether or not there is a request in the schedule queue 154 with a high priority (Step S2201). When there is a request in the schedule queue 154 with a high priority ("T" in the result of Step S2201), the CPU 110 retrieves a maximum number of M requests from the schedule queue 154 with a high priority (Step S2202).

On the other hand, when there is no request in the schedule queue 154 with a high priority ("F" in the result of Step S2201), the CPU 110 determines whether or not there is a request in the schedule queue 154 with a low priority (Step S2203). When there is no request in the schedule queue 154 with a low priority ("F" in the result of Step S2203), the schedule queues 154 do not contain any request, and thus the CPU 110 ends this processing.

Further, when there is a request in the schedule queue 154 with a low priority ("T" in the result of Step S2203), the CPU 110 retrieves a maximum number of N requests from the schedule queue 154 with a low priority (Step S2204). At this time, M and N may be the same value, or N may be a value smaller than M so that requests with high priorities can be processed.

The CPU 110 sorts the requests retrieved from the schedule queue 154 (Step S2205). For example, the CPU 110 determines the order such that requests with higher priorities are processed preferentially. Further, when priorities are the same, requests with a larger amount of subsequent processing (with a larger amount of remaining processing time) may be processed preferentially, or requests with a smaller amount of subsequent processing (with a smaller amount of remaining processing time) may be processed preferentially in order to reduce requests contained in the issue queue 155 to the minimum.

Further, when requests are contained in the issue queue 155, the retrieved requests and requests contained in the issue queue 155 may be sorted together.

Lastly, the CPU 110 stores the sorted requests into the issue queue (Step S2206), and ends this processing. When generation of a thread is allowed, a request stored in the issue queue is retrieved from the head of the queue to be processed in the generated thread. Then, an input/output request is issued (transmitted) to the external storage apparatus 200 in the generated thread, and a response to the input/output request is processed.

In the case of an input/output request for a file, contents of a file are retrieved in units of pages for respective threads. At this time, the retrieved contents may be combined to generate the file and then transmitted to the client 300, or may be transmitted to the client 300 separately without the file being generated and the client 300 may combine the retrieved contents to generate the file.

On the other hand, in the case of a consistency verification request for a storage area, as described above, verification results are written into the verification result table 140 for respective threads. Then, after consistency verification for a specified storage area is complete, the verification result table 140 is output.

Instead of an access request for a file or a consistency verification request for a storage area, tasks corresponding to respective requests may be stored in the schedule queue 154 and the issue queue 155 of the input/output control module 153.

As described above, according to the first embodiment of the present invention, it is possible to process consistency verification for pages in parallel, and thus to execute consistency verification at higher speeds compared to the case of verifying pages sequentially. In particular, provision of a larger number of storage devices, which form the storage area provided by the external storage apparatus 200, improves parallel processing.

In the first embodiment of the present invention, a description has been given of an example in which consistency verification is executed in units of storage areas. However, consistency verification may be executed in units of files or directories.

In the first embodiment described above, a description has been given of an example in which consistency verification is executed for pages in parallel for a network file system (network attached storage; NAS). However, this embodiment may also be applied to an application server or a database server to which a disk array device is connected without including an external storage apparatus.

Second Embodiment

In the first embodiment, a description has been given of an example in which the present invention is applied to consistency verification for a file (data) stored in the storage apparatus. However, in a second embodiment of the present invention, a description is given of an example in which the present invention is applied to consistency verification for data managed by a database system.

Figure 13:
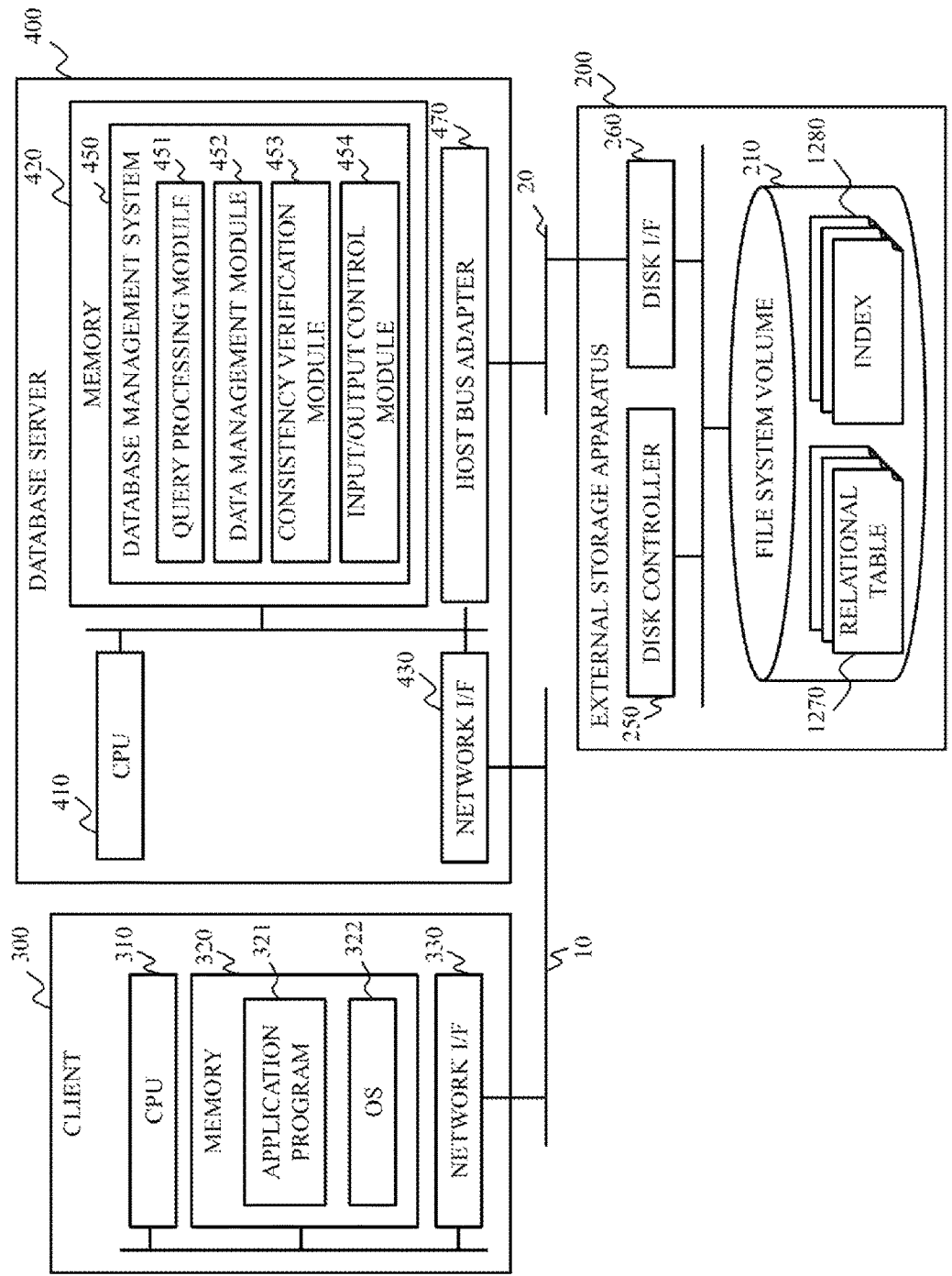
FIG. 13 is a diagram for illustrating a configuration of a database system according to a second embodiment of the present invention.

FIG. 13 is a diagram for illustrating a configuration of a database system according to the second embodiment of the present invention. The database system according to the second embodiment of the present invention includes a database server 400 configured to manage data stored in the external storage apparatus 200 instead of the network file system server 100 according to the first embodiment. The same components of the external storage apparatus 200 and the client 300 as those of the first embodiment are given the same reference symbols.

In this embodiment, the client 300 is configured to execute the application program 321, and to access data managed by the database server 400. The external storage apparatus 200 is configured to store data managed by the database server 400. The computer system may include a management computer for managing the database.

The configurations of the external storage apparatus 200 and the client 300 are similar to those of the first embodiment. Further, the network 10 and the network 20 are similar to those of the first embodiment, and as described above, the network 10 and the network 20 may be the same network.

Examples of the database system area relational database (RDB) that is based on a relational model and an object-oriented database that is based on an object model. In this embodiment, a description is given based on a relational database.

The relational database stores data in units of records, which are each formed of a plurality of kinds of data, into a relational table 1270, and includes an index 1280 for accessing a record with a small number of input/output requests. The data structure of the index 1280 is a B+ tree as described later in this embodiment, but may be a B tree or a hash.

In the database system according to this embodiment, the relational table 1270 and the index 1280 are stored in the external storage apparatus 200. However, the relational table 1270 and the index 1280 may be stored in a storage device included in the database server 400.

The database server 400 includes a CPU 410, a memory 420, a network I/F 430, and a host bus adapter 470. The CPU 410, the memory 420, and the network I/F 430 are similar to the CPU 110, the memory 120, and the network interface (I/F) 130 of the network file system server 100 according to the first embodiment, and have equivalent functions. Further, the host bus adapter 470 is similar to the network file access interface (I/F) 170.

The database server 400 executes a database management system 450, which is a program stored in the memory 420, to thereby manage data stored in the external storage apparatus 200. In the second embodiment, similarly to the case of the first embodiment, the memory 420 stores a driver having a function equivalent to that of the first embodiment, and thus a description thereof is omitted here.

The database management system 450 includes a query processing module 451, a data management module 452, a consistency verification module 453, an input/output control module 454, and other components.

The query processing module 451 is configured to receive a data access request transmitted from the client 300. The data access request is described in, for example, SQL. Further, the query processing module 451 accesses data stored in the external storage apparatus 200 based on the received data access request.

The data management module 452 includes a function (program) and management information for managing data in the database system according to this embodiment. The management information contains, for example, information indicating storage positions of the relational table 1270 and the index 1280.

The consistency verification module 453 is configured to verify whether or not a referred record defined in the index 1280 is stored in the relational table 1270. Specifically, the consistency verification module 453 verifies whether or not a referred record defined in the index 1280 exists in the relational table 1270 and whether or not its storage space exists. Details thereof are described later with reference to FIG. 14 and FIG. 15. The consistency among indices in the index 1280 may be verified.

Further, the consistency verification module 453 verifies whether or not relations (reference consistency) among records stored in the relational table 1270 are kept correct. The database management system 450 (for example, the data management module 452) usually prevents update or deletion of a record that destroys reference consistency. However, a record that causes an inconsistent relation may be generated when, for example, definition of reference consistency is erroneous or the definition is not given in the first place. The consistency verification module 453 according to this embodiment detects such inconsistency. Details thereof are described later with reference to FIG. 16 and FIG. 17.

Similarly to the first embodiment, the input/output control module 454 is configured to control input/output of data stored in the external storage apparatus 200. Specifically, the input/output control module 454 accesses data stored in the external storage apparatus 200 based on a request from the query processing module 451 or the consistency verification module 453.

For example, in the case of query processing, the input/output control module 454 receives a query request transmitted from the client 300, and sends the query request to the query processing module 451. Then, the query processing module 451 processes the query request, and sends a query result to the input/output control module 454 as a response. The input/output control module 454 transmits the query result to the client 300.

On the other hand, in the case of consistency verification, the input/output control module 454 receives a verification request transmitted from a management computer or the like, and sends the verification request to the consistency verification module 453. Then, the consistency verification module 453 executes consistency verification, and sends a verification result to the input/output control module 454 as a response. The input/output control module 454 transmits the verification result to a request source of consistency verification.

At this time, similarly to the first embodiment, the input/output control module 454 manages an execution order of received requests (query request and verification request). For example, the input/output control module 454 stores a query request into a schedule queue with a high priority and a verification request into a schedule queue with a low priority, and sequentially generates threads for executing tasks that process requests similarly to the first embodiment.

Figure 14:
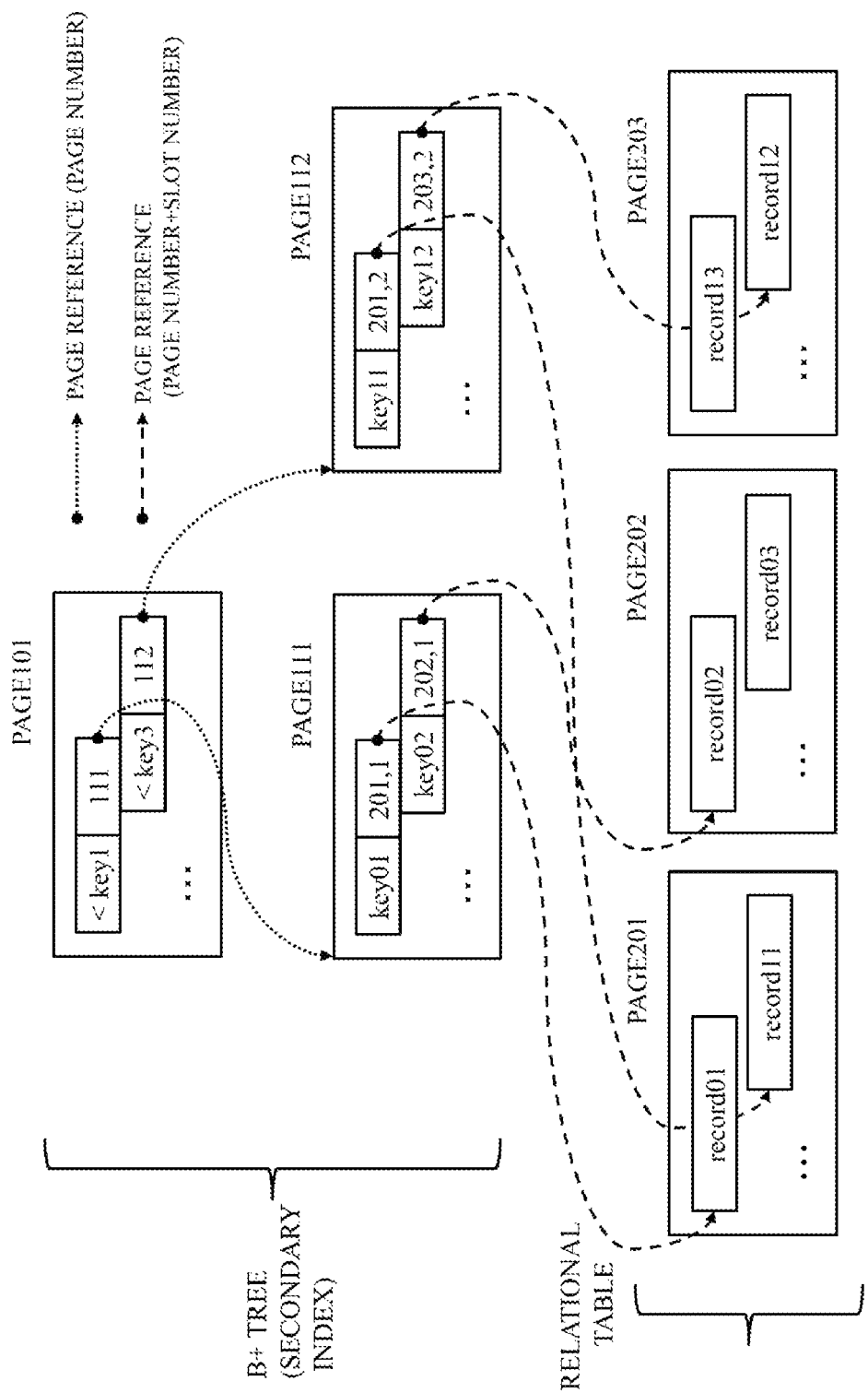
FIG. 14 is a diagram for illustrating data structure of the database system according to the second embodiment of the present invention, and represents a state in which data is stored normally.
Figure 15:
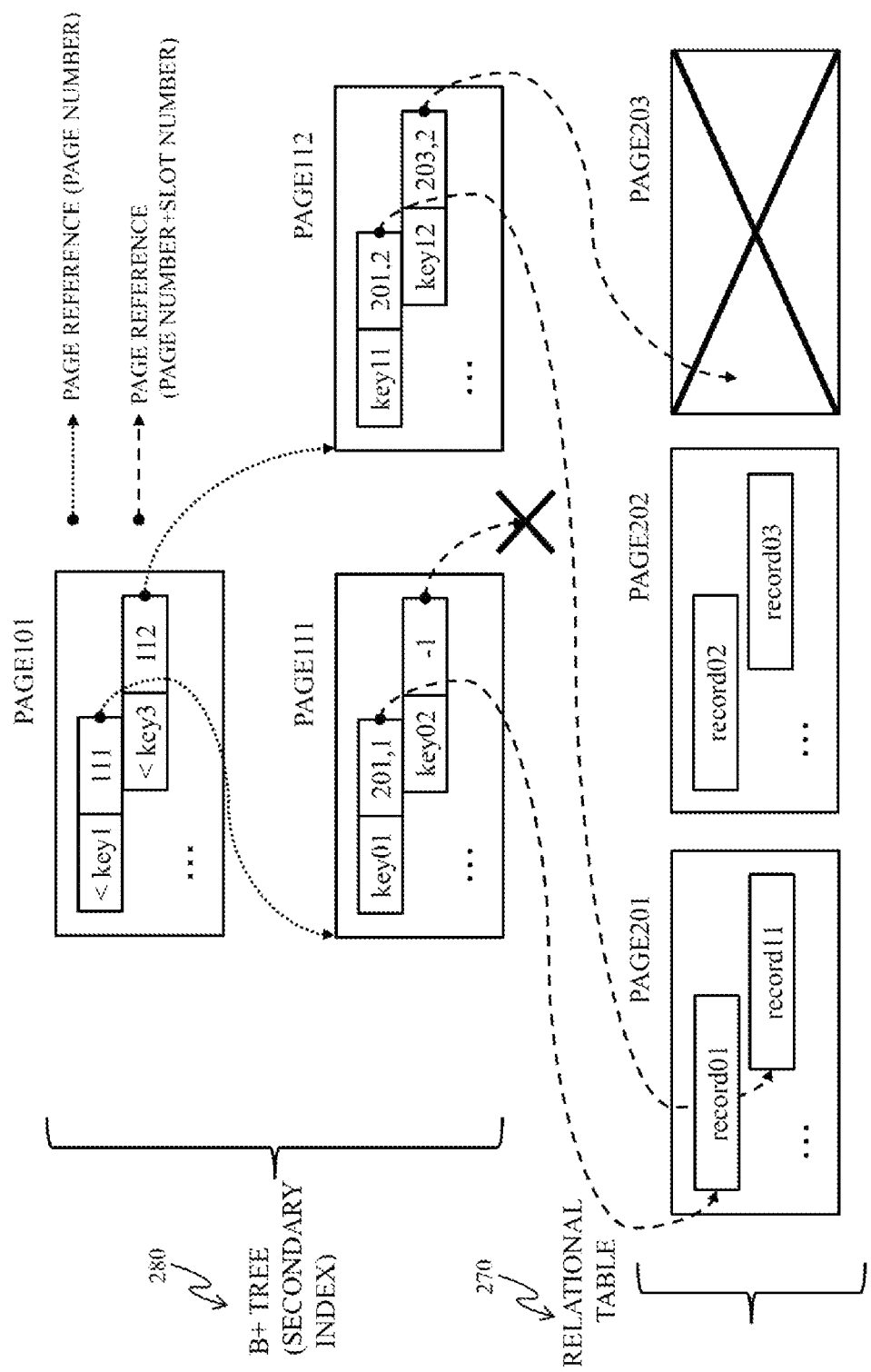
FIG. 15 is a diagram for illustrating data structure of the database system according to the second embodiment of the present invention, and represents a state in which storage information of data is inconsistent.

Next, a description is given of data structure of a record stored in the relational table 1270 and the index 1280. FIG. 14 and FIG. 15 are diagrams for illustrating data structure of the relational table and the index in the database system according to the second embodiment of the present invention. FIG. 14 represents a state in which data is stored normally, whereas FIG. 15 represents a state in which storage information of data is inconsistent.

In this embodiment, a description is given of an example taking the case of a secondary index, which is an index for an attribute other than a primary key, as an example. The secondary index does not need to store a data record, and only needs to hold storage information (pointer or record identifier) of a record in combination with a key.

The secondary index is formed of a B+ tree, and the page 101 is a page corresponding to the root. The B+ tree stores storage information of a record of a relational table 1270 only in a page corresponding to a leaf. In FIG. 14 and FIG. 15, the page 111 and the page 112 serving as leaves are referred to from the page 101 serving as the root.

Further, the storage information only contains a page number as a reference between pages in the secondary index. On the other hand, a reference from a leaf to the relational table 1270 (page 201 to page 203) contains a page number and a slot number. The slot number is information indicating a position at which a record is stored in a page.

The relational table 1270 and the index 1280 are configured based on the data structure described above. As illustrated in FIG. 14, in the page 101 serving as the root, reference information of a record falling within a range of from a key 1 to a key 3 is stored in the page 111 and reference information of a record falling within a range of after the key 3 is stored in the page 112. In addition, it is illustrated that a record corresponding to a key 01 is stored in an area corresponding to a slot number 1 of the page number 201 in the page 111. Storage areas are similarly identified for other records.

In contrast, in the state illustrated in FIG. 15, the storage area of a record corresponding to a certain key cannot be identified. Specifically, the area in which a record corresponding to a key 02 in the page 111 is stored is set to "−1", and thus the storage position of the record cannot be identified. Further, it is illustrated that a record corresponding to a key 12 in the page 112 is stored in an area corresponding to a slot number 2 of the page 203, but the page 203 does not exist.

In consistency verification according to the second embodiment of the present invention, it is possible to detect inconsistency in which the storage area of a record cannot be identified with the index 1280. Basically, the consistency verification can be handled similarly to the procedure illustrated in the first embodiment (FIG. 4 and FIG. 5).

The index 1280 contains a plurality of indices, and those indices can be obtained by the data management module 452. Thus, indices (corresponding to files in the first embodiment) contained in the index 1280 are sequentially selected and consistency verification is executed, to thereby enable execution of processing similar to the procedure illustrated in the flowchart of FIG. 4.

Further, it is possible to execute consistency verification for each index similarly to the procedure illustrated in the flowchart of FIG. 5. First, a page to be verified serving as the root of indices is identified (Step S1101), and this page is read (Step S1102). Then, the validity of the page is determined (Step S1103). It is determined whether or not the page to be verified refers to another page (Step S1105) followed by determination of the validity of the referenced page (Step S1106). When the referenced page is valid, a new thread is generated to execute consistency verification for the referenced page (Step S1108).

As described above, it is also possible to apply the present invention to consistency verification for indices in a database system. According to the second embodiment of the present invention, when one storage area is formed by a plurality of storage devices, it is possible to execute consistency verification in parallel, to thereby be able to execute verification at high speeds particularly in a large scale database system. Further, it is possible to finish consistency verification for indices at high speeds, to thereby be able to improve reliability of the entire computer system.

Figure 16:
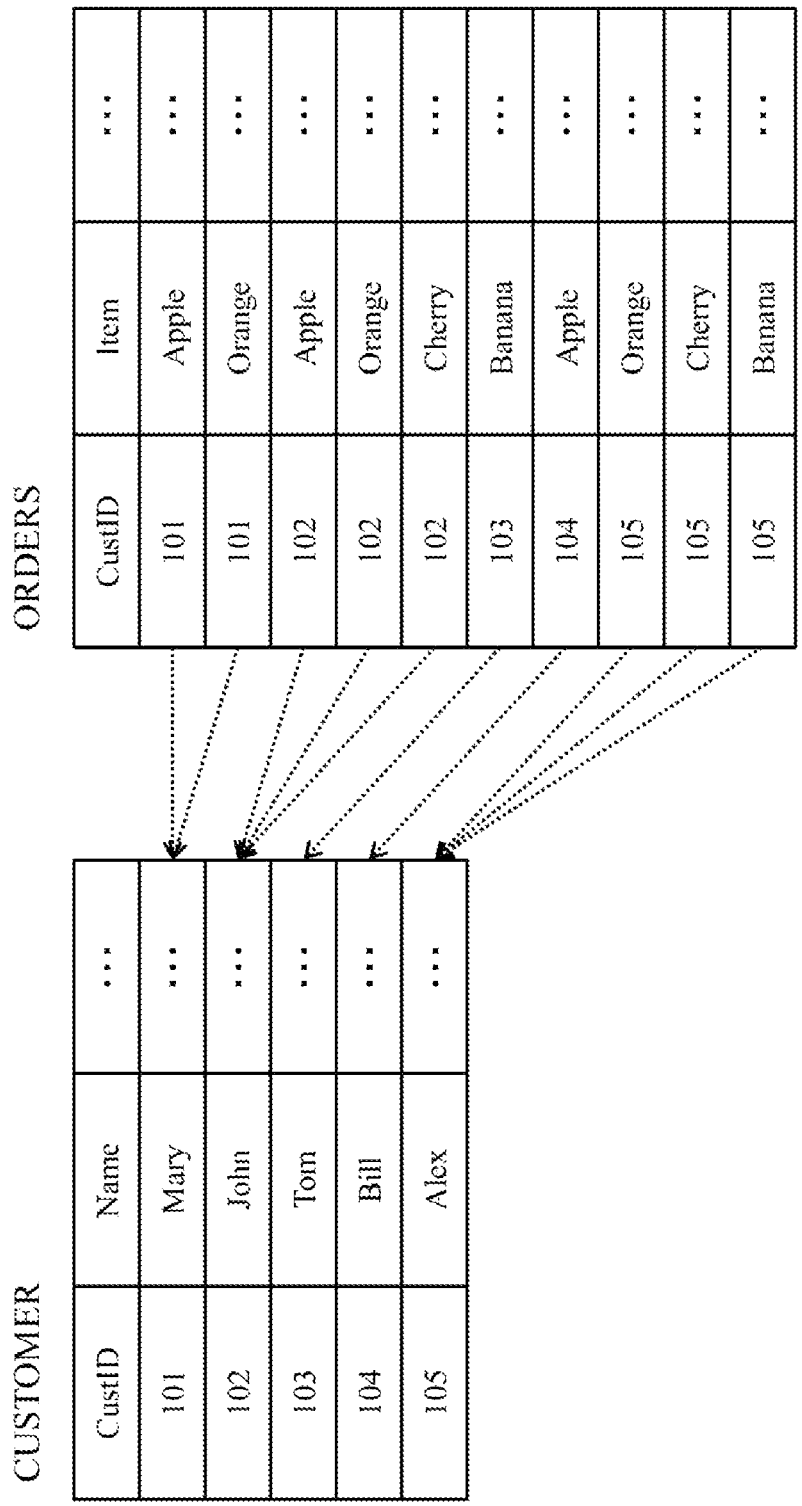
FIG. 16 is a diagram for illustrating a data model of the database system according to the second embodiment of the present invention, and represents a state in which data is stored normally.
Figure 17:
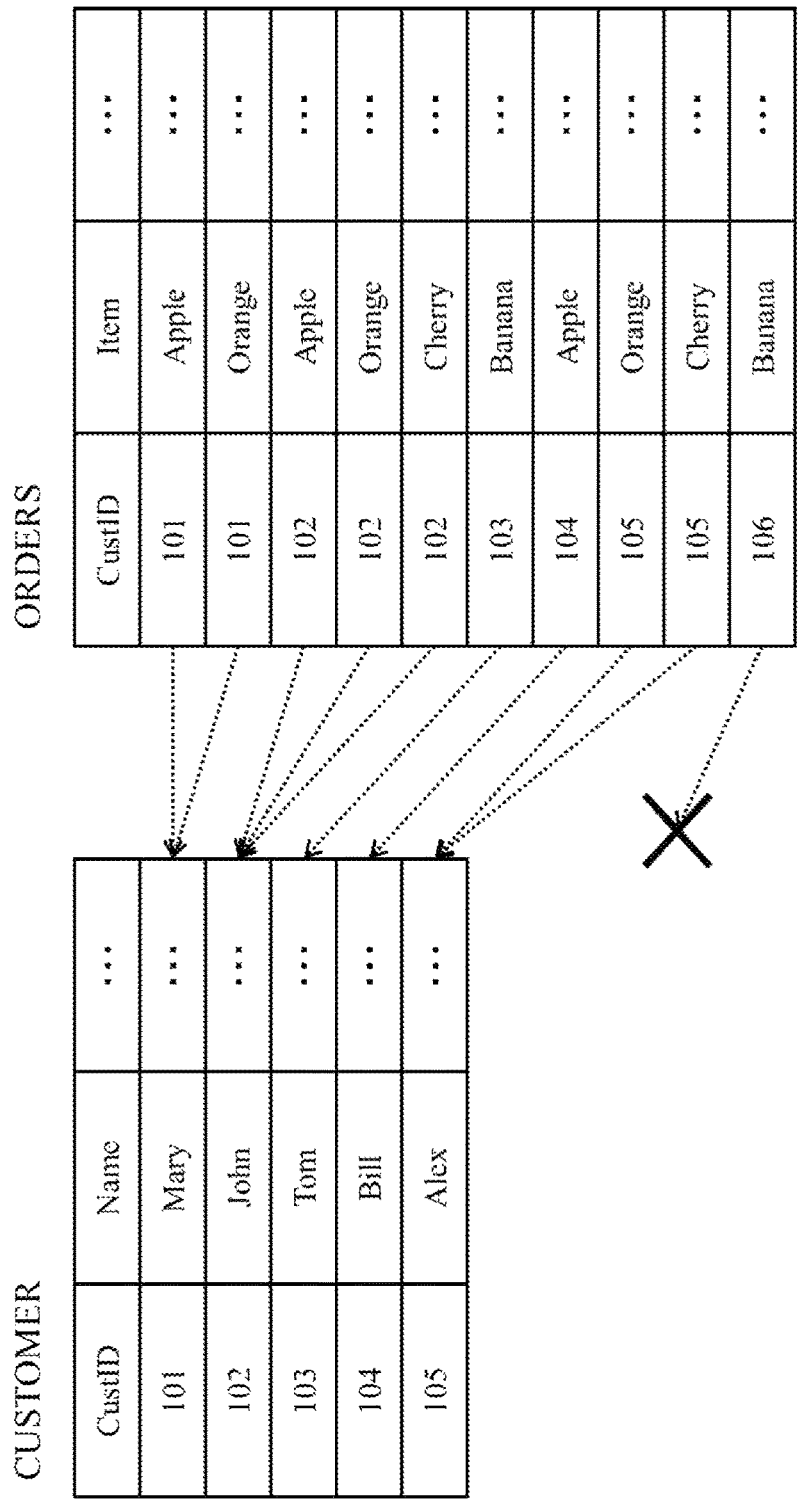
FIG. 17 is a diagram for illustrating the data model of the database system according to the second embodiment of the present invention, and represents a state in which storage information of data is inconsistent.

Next, a description is given of a case in which inconsistency that has occurred in the relation among records contained in the relational table is detected. FIG. 16 and FIG. 17 are each a diagram for illustrating a data model in the database system according to the second embodiment of the present invention. FIG. 16 represents a normal state (state in which inconsistency has not occurred among records), whereas FIG. 17 represents a state in which inconsistency has occurred among records.

In FIG. 16 and FIG. 17, a "CUSTOMER" table for storing customer information and an "ORDERS" table for storing order information of customers are illustrated, and the tables are associated with each other by a CustID. Deletion of a record corresponding to the CustID contained in the "ORDERS" table from the "CUSTOMER" table results in elimination of customer information corresponding to the order. Thus, when the CustID is contained in the "ORDERS" table, the database management system 450 (data management module 452) usually performs control such that the corresponding record is not deleted from the "CUSTOMER" table.

As illustrated In FIG. 16, when the relation among records of the "CUSTOMER" table and the "ORDERS" table is normal, records whose CustIDs correspond to respective records contained in the ORDERS table all exist.

On the other hand, a record whose CustID is "106" is contained in the "ORDERS" table illustrated in FIG. 17, but a record of the corresponding CustID is not contained in the "CUSTOMER" table, resulting in incomplete data in which customer information is not contained in order information whose CustID is "106".

Further, in the examples illustrated in FIG. 16 and FIG. 17, simple structure of one relational table referring to another relational table is adopted. However, in general, the relational database normalizes its relational table so that the data amount is suppressed to the minimum and duplication of data is avoided. Thus, in a large scale database, a transaction table may refer to a lot of master tables, resulting in a possibility that a lot of costs are required to detect inconsistent records. To address this issue, through application of consistency verification according to the present invention, it is possible to quickly detect inconsistency of the relation among records.

The relation among records of a relational table managed by a database system can be expressed in tree structure based on definition information of the database. Thus, through setting of each record of a relational table (e.g., "ORDERS" table) referring to another relational table (e.g., "CUS- TOMER" table) as the root, it is possible to execute consistency verification for each record (field) similarly to the procedure illustrated in the first embodiment (FIG. 4 and FIG. 5).

When a plurality of records refer to one record, duplicate records may be excluded in advance for verification for each field (e.g., CustID) to be verified, or verification may be controlled so as not to be executed again for the verified field. Further, consistency verification may be executed for each relational table, not for each record (field).

According to the second embodiment of the present invention, it is possible to reduce a period of time required for verifying consistency among indices and records of a relational table and consistency among records of a relational table in a database system.

Although a detailed description has been given of the present invention referring to the attached drawings, the present invention is not limited to the specific configuration described above, and includes various variations and equivalent configurations within the scope of the accompanying claims.

INDUSTRIAL APPLICABILITY

The present invention can be applied to a computer system configured to store a file (data) in a storage apparatus and manage the file (data).

The invention claimed is:

1. A computer system, comprising:
a storage apparatus comprising a storage area formed by storage devices, wherein the storage area stores a plurality of pieces of data; and
a computer comprising a processor and a memory,
wherein the computer
receives a query for a first piece of data;
verifies whether or not the first piece of data is stored in the storage area and in parallel also verifies whether or not a second piece of data wherein the first, second, and third pieces of data are all different;
stores the first piece of data and a result of the corresponding verification in the memory and recovers a file associated with the first piece of data when the first piece of data is verified to not be stored in the storage area; and
prevents update or deletion of any of the plurality of pieces of data that disassociates the second piece of data from the third piece of data when the second piece of data and the third piece of data are verified to be associated with each other.

2. The computer system according to claim 1, wherein the computer further:
manages resource information of the computer system;
generates a task for issuing an execution request for each of the verifications;
determines whether or not to generate a thread for executing the task based on the resource information; and
holds generation of the thread when determining not to generate the thread.

3. The computer system according to claim 2,
wherein the computer comprises an input/output control module that receives the execution request, and manages an execution schedule of Rail the task that is based on the execution request,
wherein the input/output control module comprises:
an issuing queue storing a request for which the execution schedule of the task is set; and
a schedule queue storing a request for which the execution schedule of the task is not set, and
wherein the input/output control module:
when the schedule queue stores a plurality of requests for a plurality of tasks, determines a processing order of the requests stored in the schedule queue;
stores the requests for which the processing order is determined in the issuing queue; and
sequentially generates threads for executing the tasks that are based on the requests stored in the issuing queue.

4. The computer system according to claim 3,
wherein the schedule queue comprises a first schedule queue and a second schedule queue, and the first schedule queue is processed in preference to the second schedule queue, and
wherein the input/output control module further:
stores, when receiving a request to read data from or to write data to the storage area, the request in the first schedule queue; and
stores, when the execution request of each of the verifications is received, the execution request in the second schedule queue.

5. The computer system according to claim 2, wherein the computer comprises an input/output control module that receives an execution request of each of the verifications, and manages an execution schedule of the task that is based on the execution request,
wherein the input/output control module comprises:
an issuing queue storing Rail the task for which the execution schedule is set; and
a schedule queue storing the task for which the execution schedule is not set, and
wherein the input/output control module:
when the schedule queue stores a plurality of tasks, determines a processing order of the tasks stored in the schedule queue;
stores the tasks for which the processing order is determined in the issuing queue; and
sequentially generates threads for executing the tasks stored in the issuing queue.

6. The computer system according to claim 5,
wherein the schedule queue comprises a first schedule queue and a second schedule queue, and the first schedule queue is executed in preference to the second schedule queue, and
wherein the input/output control module further:
stores a task for reading data from or writing data to the storage area in the first schedule queue; and
stores a task for executing each of the verifications in the second schedule queue.

7. The computer system according to claim 1,
wherein the plurality of pieces of data stored in the storage area is divided into pages of a predetermined site, and
wherein the computer further:
manages management information containing arrangement of the pages; and
verifies whether or not each of the pages is set to correctly store the plurality of pieces of data in the storage area based on the management information.

8. The computer system according to claim 7,
wherein the pages each store at least one of the divided data or a page identifier referring to another page, and
wherein the management information contains a page identifier referring to one of the pages storing the divided data.

9. The computer system according to claim 8,
wherein a first tree structure is formed in which the pages each comprise a node, and a connection to another page referred to by a page identifier contained in each of the pages comprises an edge,
wherein the plurality of pieces of data forms a second tree structure in which a page identified by a page identifier contained in the management information is set as a root, and
wherein the plurality of pieces of data is divided and stored in a page corresponding to a leaf.

10. The computer system according to claim 1,
wherein the computer further executes a database management system for managing the plurality of pieces of data,
wherein plurality of pieces of the data is stored in a relational table formed of records containing one or more columns corresponding to the plurality of pieces of data, and
wherein the computer further:
  manages an index containing the plurality of pieces of data and storage information of records containing columns corresponding to the plurality of pieces of data; and
  verifies whether or not the storage information of records containing columns corresponding to the plurality of pieces of data is correctly set in the index.

11. The computer system according to claim 1,
wherein the computer further executes a database management system for managing the plurality of pieces of data, and the plurality of pieces of the data are associated with each other,
wherein the plurality of pieces of data are stored in relational tables each formed of records containing one or more columns corresponding to each piece of the plurality of pieces of data, and
wherein the computer further verifies that the relational tables are correctly set so that the plurality of pieces of data are associated with each other.

12. A method of verifying data, which is executed in a computer system, the computer system comprising:
  a storage apparatus comprising a storage area formed by storage devices, wherein the storage area stores a plurality of pieces of data; and
  a computer comprising a processor and a memory the method, which is executed by the computer, comprising:
    receiving a query for a first piece of data;
    verifying whether or not the first piece of data is stored in the storage area and in parallel also verifying whether or not a second piece of data and a third niece of data of the plurality of pieces of data are associated with each other, wherein the first second and third pieces of data are all different;
    storing the first piece of data and a result of the corresponding verification in the memory and recovering a file associated with the first piece of data when the first piece of data is verified to not be stored in the storage area; and
    preventing update or deletion of any of the plurality of pieces of data that disassociates the second piece of data from the third piece of data when the second piece of data and the third piece of data are verified to be associated with each other.

13. A computer, which is connected to a storage apparatus comprising a storage area formed by storage devices, the computer comprising:
  an interface connecting to the storage apparatus;
  a memory storing a program; and
  a processor executing the program,
  wherein the storage area stores a plurality of pieces of data,
  wherein the processor:
    receives a query for a first piece of data;
    verifies whether or not the first piece of data is stored in the storage area, and in parallel also verifies whether or not a second piece of data and a third piece of data of the plurality of pieces of data are associated with each other, wherein the first, second, and third pieces of data are all different;
    stores the first piece of data and a result of the corresponding verification in the memory and recovers a file associated with the first niece of data when the first niece of data is verified to not be stored in the storage area; and
    prevents update or deletion of any, of the plurality of pieces of data that disassociates the second piece of data from the third piece of data when the second piece of data and the third of data are verified to be associated with each other.

* * * * *